United States Patent
Lin

(10) Patent No.: US 9,526,983 B2
(45) Date of Patent: Dec. 27, 2016

(54) VIRTUAL REALITY AVATAR TRAVELING CONTROL SYSTEM AND VIRTUAL REALITY AVATAR TRAVELING CONTROL METHOD

(71) Applicant: Chih-Feng Lin, New Taipei (TW)

(72) Inventor: Chih-Feng Lin, New Taipei (TW)

( * ) Notice: Subject to any disclaimer, the term of this patent is extended or adjusted under 35 U.S.C. 154(b) by 343 days.

(21) Appl. No.: 14/465,820

(22) Filed: Aug. 21, 2014

(65) Prior Publication Data

US 2015/0352441 A1 Dec. 10, 2015

Related U.S. Application Data

(60) Provisional application No. 62/007,414, filed on Jun. 4, 2014.

(51) Int. Cl.
| | | |
|---|---|---|
| *A63F 13/214* | (2014.01) | |
| *A63F 13/25* | (2014.01) | |
| *G06F 3/01* | (2006.01) | |
| *A63F 13/428* | (2014.01) | |
| *A63F 13/213* | (2014.01) | |
| *A63F 13/212* | (2014.01) | |

(52) U.S. Cl.
CPC .............. *A63F 13/25* (2014.09); *A63F 13/212* (2014.09); *A63F 13/213* (2014.09); *A63F 13/214* (2014.09); *A63F 13/428* (2014.09); *G06F 3/017* (2013.01); *A63F 2300/6607* (2013.01); *A63F 2300/8082* (2013.01)

(58) Field of Classification Search
CPC ...... A63F 13/25; A63F 13/212; A63F 13/213; A63F 13/214; A63F 13/428; G06F 3/017
See application file for complete search history.

(56) References Cited

U.S. PATENT DOCUMENTS

| | | | | |
|---|---|---|---|---|
| 4,925,189 A | * | 5/1990 | Braeunig | A63F 13/06 273/148 B |
| 4,988,981 A | * | 1/1991 | Zimmerman | A61B 5/1114 345/156 |
| 5,442,168 A | * | 8/1995 | Gurner | A63F 13/06 250/221 |
| 5,913,727 A | * | 6/1999 | Ahdoot | A63F 13/06 345/156 |
| 2002/0065121 A1 | * | 5/2002 | Fukunaga | A63F 13/08 463/8 |
| 2009/0027337 A1 | * | 1/2009 | Hildreth | G06F 3/011 345/158 |
| 2011/0009241 A1 | * | 1/2011 | Lane | A63B 24/0087 482/8 |
| 2011/0098109 A1 | * | 4/2011 | Leake | A63F 13/213 463/30 |
| 2011/0304632 A1 | * | 12/2011 | Evertt | G06F 3/011 345/474 |

(Continued)

*Primary Examiner* — Corbett B Coburn

(74) *Attorney, Agent, or Firm* — Winston Hsu; Scott Margo

(57) ABSTRACT

A virtual reality avatar traveling control system comprising: at least one body location sensing apparatus, for providing body location information according to body locations of a user; a body location determining apparatus, for computing a location for a first limb of the user according to the body location information; and a moving deciding apparatus, for deciding a moving speed level and a moving direction of an avatar according to the location for the first limb, to thereby generate at least one moving parameter.

41 Claims, 24 Drawing Sheets

(56) References Cited

U.S. PATENT DOCUMENTS

| | | | |
|---|---|---|---|
| 2013/0005467 A1* | 1/2013 | Kim ........................ | A63F 13/06 463/36 |
| 2014/0143784 A1* | 5/2014 | Mistry ................ | G06F 15/0208 718/102 |
| 2014/0270387 A1* | 9/2014 | Hoof ..................... | G06T 7/2086 382/107 |
| 2014/0274379 A1* | 9/2014 | Justice ................... | A63F 13/12 463/31 |

* cited by examiner

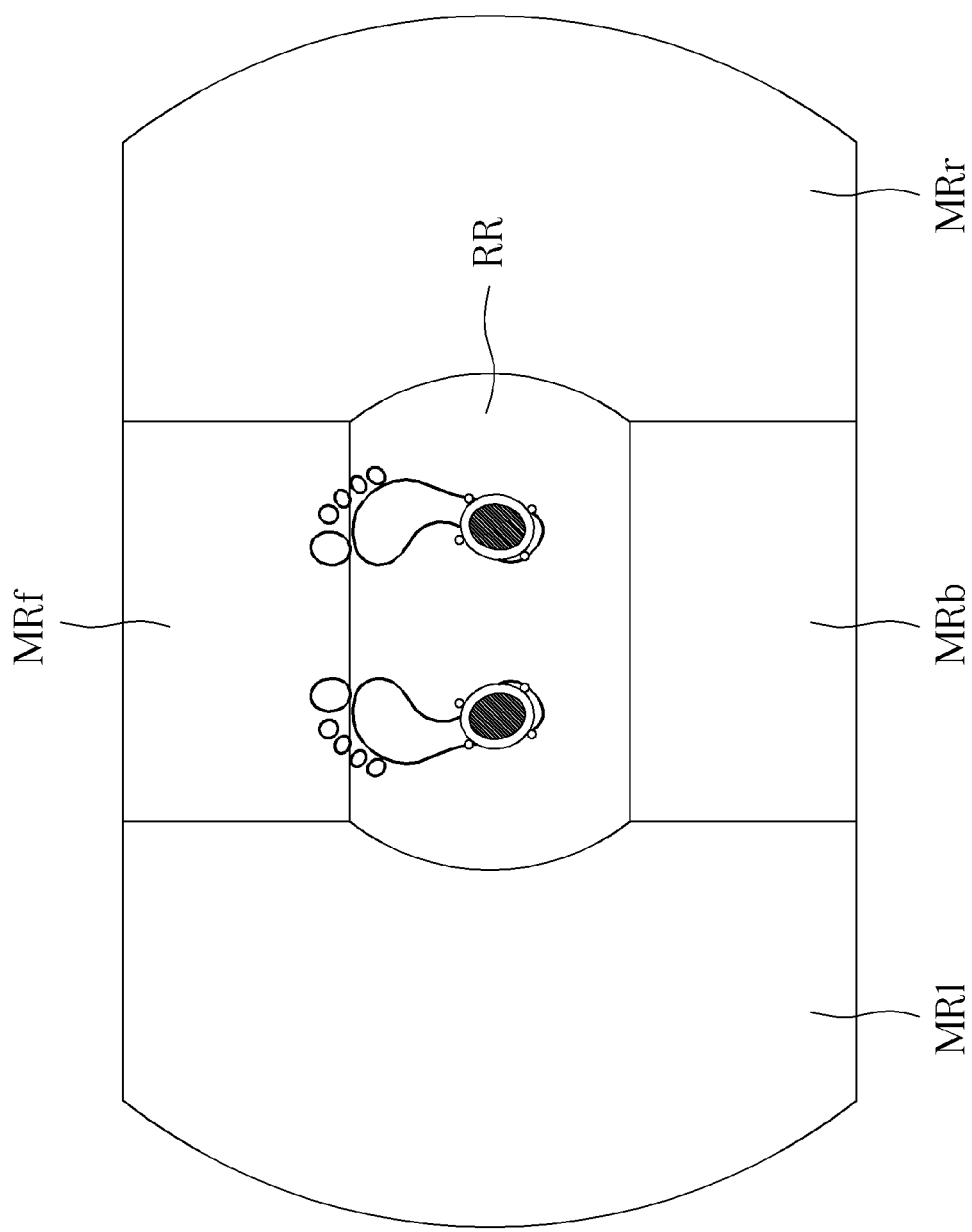

VIRTUAL REALITY AVATAR TRAVELING CONTROL SYSTEM AND VIRTUAL REALITY AVATAR TRAVELING CONTROL METHOD

CROSS REFERENCE TO RELATED APPLICATIONS

This application claims the priority of U.S. Provisional Application No. 62/007,414, filed Jun. 4, 2014, which is included herein by reference.

BACKGROUND OF THE INVENTION

1. Field of the Invention

The present invention relates to a virtual reality avatar traveling control system (herein after: vrat control system) and a virtual reality avatar traveling control method (herein after: vrat control method), and particularly relates to a vrat control system and a vrat control method that can decide a moving speed level or a moving direction via a plurality of moving regions.

2. Description of the Prior Art

A vrat control system is very popular in recent years. A user can use the body motion thereof to control a role (an avatar) in a game via the vrat control system.

The conventional vrat control system always controls the "traveling" for the role in the game via following two methods: an operation simulating platform or a conventional game controller. The operation simulating platform, such as a treadmill-like apparatus, can support walking, running for multi directions and a direct up/down jumping, but cannot simulate some operations such as climbing or crawling. Additionally, the operation simulating platform may occupy too much space, and the user may use too much vigor to control the operation simulating platform. The conventional game controller, such as a joystick or a keyboard, cannot provide "total immersion" experience to the user.

Furthermore, no protection mechanism is provided for such technique, thus the user may be dangerous while playing the game. For example, if the user wears a head mount display to play the game, the user may walk to a dangerous place since the user cannot see the real environment surround him.

SUMMARY OF THE INVENTION

Therefore, one objective of the present invention is to provide a vrat control system and a vrat control method that the user can easily control the avatar.

Another objective of the present invention is to provide a vrat control system and a vrat control method that can provide a protection mechanism.

One embodiment of the present invention discloses a virtual reality avatar traveling control system, which comprises: at least one body location sensing apparatus, for providing body location information according to body locations of a user; a body location determining apparatus, for computing a location for a first limb of the user according to the body location information; and a moving deciding apparatus, for deciding a moving speed level and a moving direction of an avatar according to the location for the first limb, to thereby generate at least one moving parameter.

Another embodiment of the present invention discloses a virtual reality avatar traveling control method, applied to a virtual reality avatar traveling control system. The method comprises: (a) generating body location information according to body locations of a user; (b) computing a location for a first limb of the user according to the body location information; and (c) deciding a moving speed level and a moving direction of an avatar according to the location for the first limb, to thereby generate at least one moving parameter.

In view of above-mentioned embodiments, the user can control the avatar in the virtual world much more effectively. Additionally, the protection mechanism can help the user to avoid going to a dangerous place or falling down.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A is a schematic diagram illustrating a rest region and moving regions according to one embodiment of the present application.

FIG. 12-FIG. 16A are schematic diagram illustrating how to decide the rest region and the moving regions according to different embodiments of the present invention.

DETAILED DESCRIPTION

Figure 1:
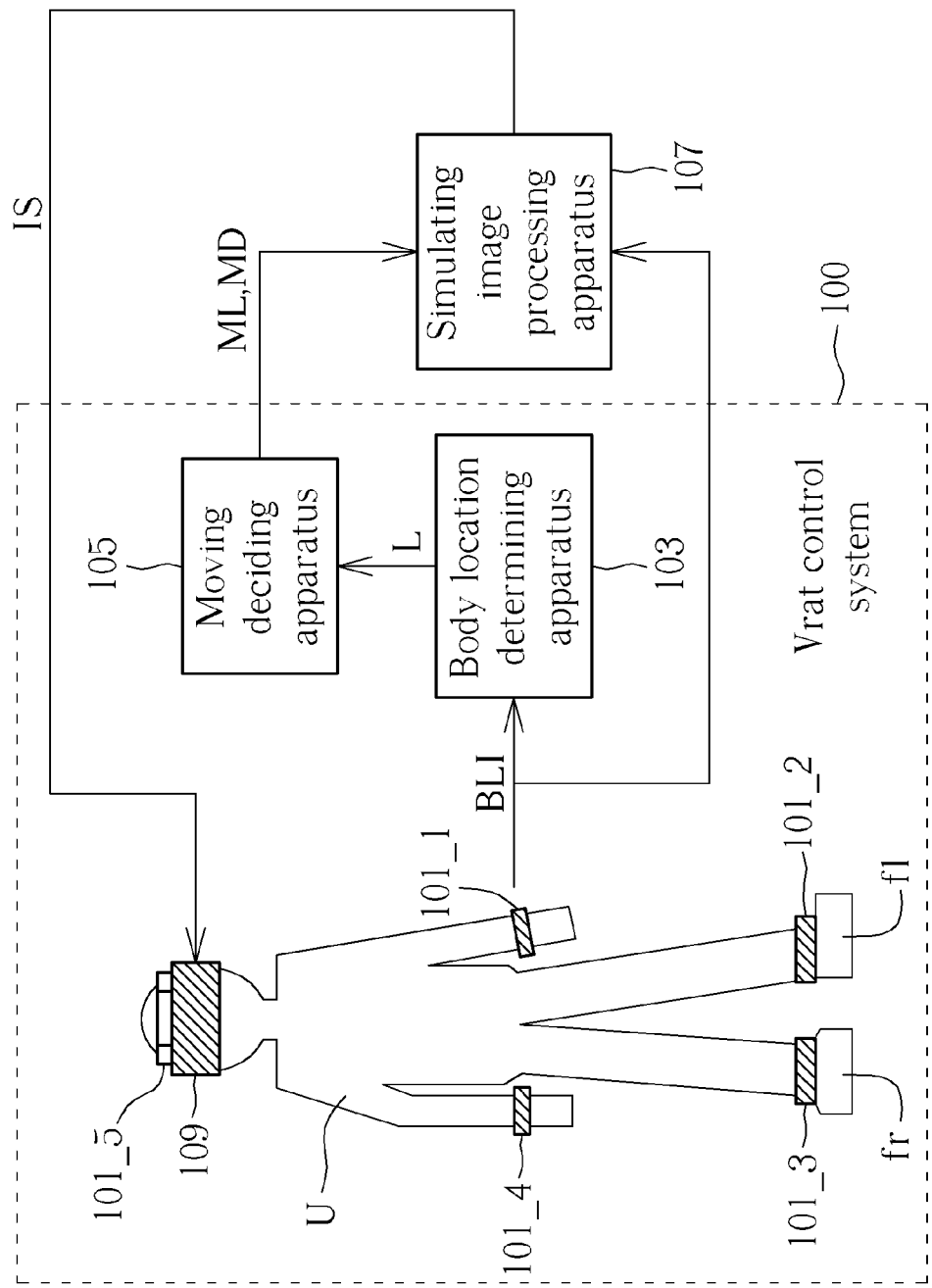
FIG. 1 is a block diagram illustrating a vrat control system according to one embodiment of the present invention.

FIG. 1 is a block diagram illustrating a vrat control system 100 according to one embodiment of the present invention. As illustrated in FIG. 1, the vrat control system 100 comprises: body location sensing apparatuses 101_1~101_5, a body location determining apparatus 103, and a moving deciding apparatus 105. The body location sensing apparatus 101_1~101_5 provide body location information according to body locations (ex. the location information for the head, hands, and feet) of a user U. The body location sensing apparatus 101_1~101_5 can be implemented to various types. In this embodiment, the body location sensing apparatuses 101_1~101_5 are wearable apparatuses. The body location determining apparatus 103 computes location for each body part of the user (ex. the left foot fl) according to the body location information BLI. The moving deciding apparatus 105 decides at least one moving parameter including a moving speed level ML and a moving direction MD of an avatar according to the location for the left foot fl. Please note the location of the feet can be decided based on the location of the body location sensing apparatus on the foot, or the heels of the feet.

The moving parameter generated by the moving deciding apparatus 105 is transmitted to the simulating image processing apparatus 107. The simulating image processing apparatus 107 generates a simulating image IS (ex. a role in a virtual world generated by a game program) according to the body location information BLI, the moving speed level ML and the moving direction MD (i.e. according to the avatar). A display 109 receives the simulating image IS and displays it. The display 109 can be implemented to various types. In this embodiment, the display 109 is a head mount display. Also, please note the simulating image processing apparatus 107 can be integrated to the vrat control system 100. In one embodiment, the simulating image processing apparatus 107 can further generate the avatar according to the information from the body location determining apparatus 103.

Figure 2:
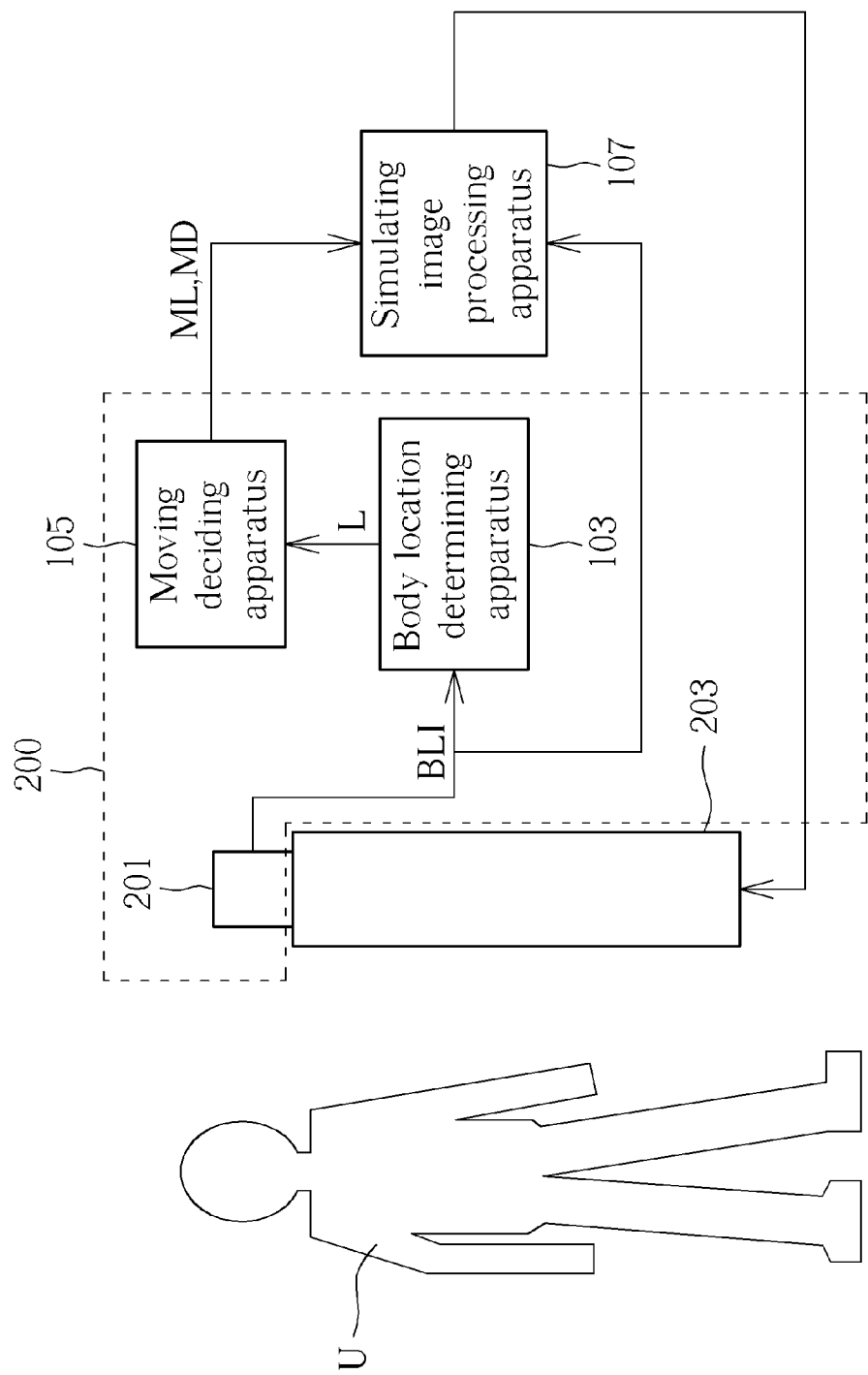
FIG. 2 is a block diagram illustrating a vrat control system according to another embodiment of the present invention.

FIG. 2 is a block diagram illustrating a vrat control system 200 according to another embodiment of the present invention. The vrat control system 200 is similar with the vrat control system 100 depicted in FIG. 1. One difference between the vrat control systems 100 and 200 is the body location sensing apparatuses 101_1~101_5 in FIG. 1 is replaced by the body location sensing apparatus 201 in FIG. 2, which is not a wearable apparatus and can be put on the display 203. The body location sensing apparatus 201, for example, is an apparatus that can capture images for the user U and generates the body location information BLI according to the images for the user U. The display 203 is a normal display such as a television or a computer screen rather than a head mount display in this embodiment. The operation for the embodiment in FIG. 2 is similar with which for the embodiment in FIG. 1, thus it is omitted for brevity here. In one embodiment, a display (or a plurality of displays) is provided surrounding the user U. In such case, the user can still see the display even if he or she turns to another direction.

Please note the arrangement for the vrat control systems in FIG. 1 and FIG. 2 do not mean to limit the present invention. For example, the body location determining apparatus 103 and the simulating image processing apparatus 107 can be integrated to a single apparatus.

Figure 3:
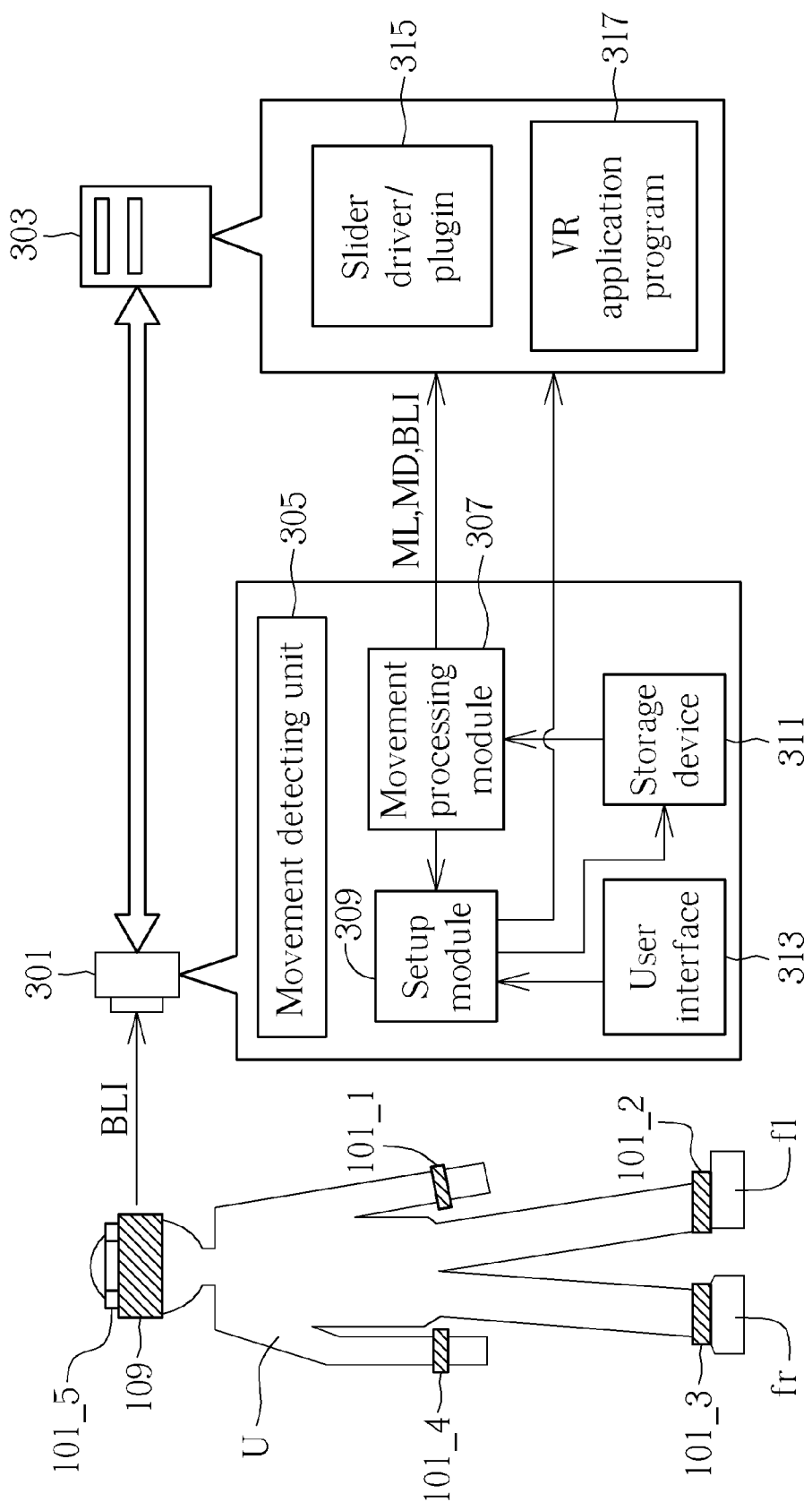
FIG. 3 is a block diagram illustrating detail blocks for the vrat control system according to one embodiment of the present invention.

FIG. 3 is a block diagram illustrating detail blocks for the vrat control system according to one embodiment of the present invention. Please note FIG. 3 is only one implementation for the vrat control system of the present invention and does not mean to limit the scope of the present invention. In this embodiment, the vrat control system 301 is coupled to a host apparatus 303. The vrat control system 301 can perform the functions for the body location determining apparatus 103 and the moving deciding apparatus 105 depicted in FIG. 1, and the host apparatus 303 (ex. a computer or a game machine) can provide the function for the simulating image processing apparatus 107 depicted in FIG. 1.

The vrat control system 301, for example, comprises a movement detecting unit 305, a movement processing module 307, a setup module 309, storage device 311 and a user interface 313. The movement detecting unit 305 receives the body location information BLI from the body location sensing apparatus 101_1~101_5. The movement processing module 307 computes the body locations, the direction that the user U towards, the moving direction MD, and the moving speed level ML according to the body location information BLI. Also, the movement processing module 307 transmits these parameters to the host apparatus 303. The setup module 309 provides the setting function to the user. For example, the user can set the rest region and the moving regions by a controller, which will be described later, via the set up module 309. Further, the setup module 309 can compute the body characteristics (ex. the body shape) for the user, and the host apparatus 303 can accordingly generate the avatar and the simulating image.

Please note the parameters generated by the movement processing module 307 can also be transmitted to the set up module 309 as parameters to set the avatar. The storage device 311 can store the parameters generated by the set up module 309 or by the movement processing module 307. The user interface 313, which is optional and can be integrated to other devices, can receive the command from the user.

The host apparatus 303 can perform the function of the simulating image processing apparatus 107 depicted in FIG. 1. In one embodiment, the host apparatus 303 comprises a driving/plug-in module 315 and a VR application program 317. The driving/plug-in module 315, which can be a program installed in the host apparatus 303, can drive a transmitting interface (not illustrated here) in the host apparatus 303 to receive the information from the movement processing module 307 and transfer the information to the VR application program 317. By this way, the VR application program 317 can control the avatar according to the information from the movement processing module 307, to perform the operation that the user desires. Further, the VR application program 317 can generate the simulating image based on the avatar in one embodiment.

Figure 4:
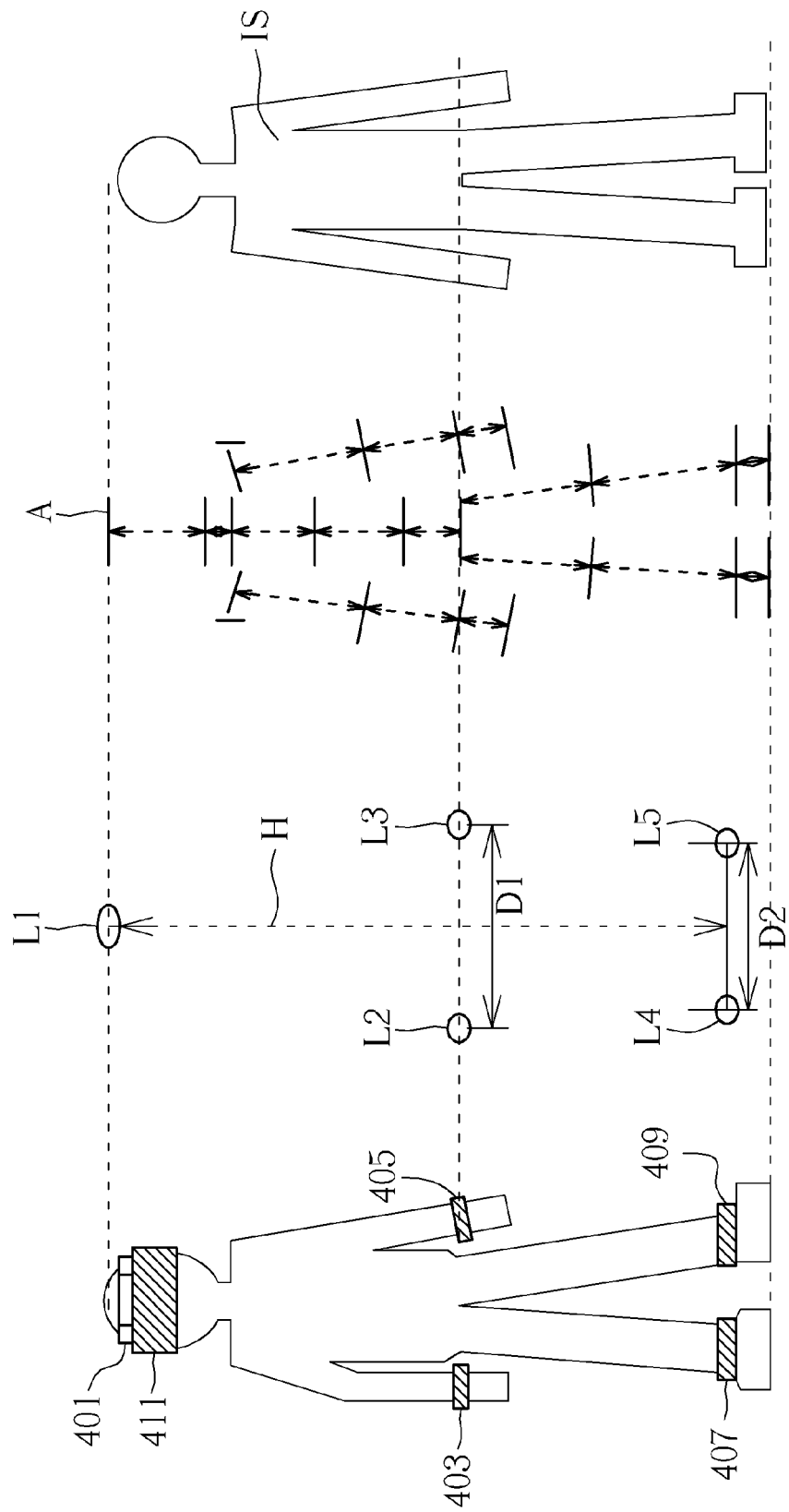
FIG. 4 is a schematic diagram illustrating an example for generating an avatar and a simulating image.

FIG. 4 is a schematic diagram illustrating an example for generating an avatar and a simulating image. As illustrated FIG. 4, the head location L1, hand locations L2, L3, and foot locations L4, L5, can be computed according to the body location information BLI from the body location sensing apparatus 401, 403, 405, 407 and 409. Additionally, the height of the user H, the distance between hands D1, and the distance between feet D2 can be computed according to the body location information BLI from the body location sensing apparatus 401, 403, 405, 407 and 409 as well. Then an avatar A can be generated based on the locations L1-L5, the height H, and the distances D1, D2. After that, the simulating image IS is generated based on the avatar A. The user can adjust the appearance of the simulating image to any appearance he wants. Alternatively, the appearance of the avatar can be adjusted by the VR application program stated in the above-mentioned embodiments according to its scenarios.

FIG. 5A is a schematic diagram illustrating a rest region and moving regions according to one embodiment of the present application. As illustrated in FIG. 5A, the body location determining apparatus 103 defines a rest region RR and a plurality of moving regions. The body location determining apparatus 103 can define the rest region and the moving regions based on various kinds of information. For example, the body location determining apparatus 103 can define the rest region and the moving regions according to the user's body shape. Of course the user can set the rest region and the moving regions by himself/herself. In this embodiment, the moving regions are surrounding the rest region RR and comprise a forward region MRf, a backward region MRb, a left region MRl and a right region MRr.

However, the number and the arrangement of the rest region RR and the moving regions are not limited to the embodiment illustrated in FIG. 5A.

Figure 5B:
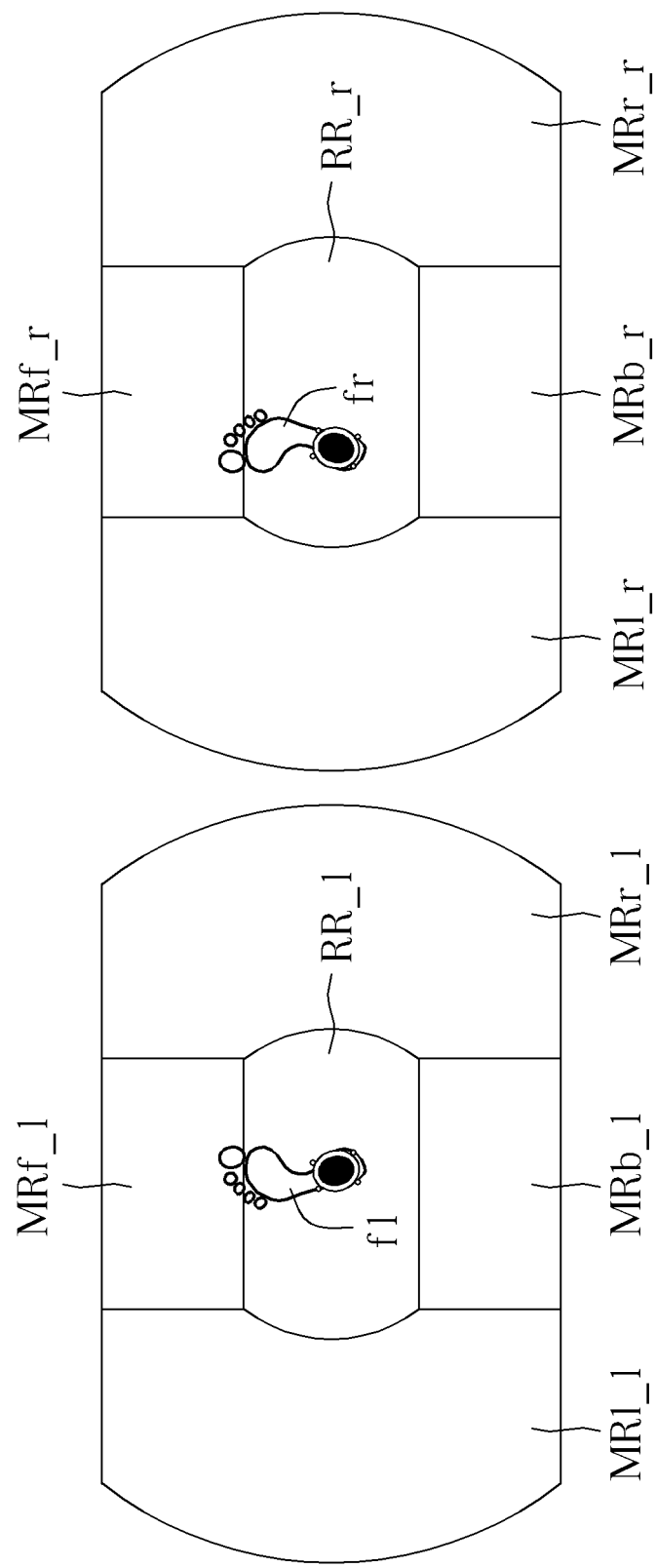
FIG. 5B is a schematic diagram illustrating rest regions and moving regions respectively for different limbs according to one embodiment of the present application.

FIG. 5B is a schematic diagram illustrating rest regions and moving regions respectively for different limbs according to one embodiment of the present application. The difference between the embodiments in FIG. 5A and FIG. 5B is the feet in FIG. 5A share the same rest region and the same moving regions, but each foot in FIG. 5B has a rest region and moving regions particularly for itself. For more detail, a left foot rest region $RR_{13}1$, a left foot forward region MRf_l, a left foot backward region MRb_l, a left foot left region MRl_l and a left foot right region MRr_l are provided in the embodiment of FIG. 5B. Additionally, a right foot rest region RR_r, a right foot forward region MRf_r, a right foot backward region MRb_r, a right foot left region MRl_r and a right foot right region MRr_r are provided in the embodiment of FIG. 5B. If the moving regions or the rest region for different feet are overlapped, the overlapped region can be set for any one of the feet. By this way, the user can use one limb to control the moving speed and the moving direction of the avatar more easily.

If both feet of the user fall into the rest region, the moving deciding apparatus decides the avatar has a first moving speed level. In this embodiment, the first moving speed level is 0. If any one of the feet for the user falls in the moving region, the moving deciding apparatus decides the avatar has a moving direction corresponding to which one of the moving regions the first foot locates in. For example, if the foot locates in the forward region MRf, the avatar moves forward. Similarly, if the foot locates in the left region MRl, the avatar moves for left. The rules for the backward region MRb and the right region MRr are similar, thus are omitted for brevity here. Please note the avatar keeps walking once the user put his foot in the moving region. For example, if the user steps into the forward region MRf for only one step and does not move anymore, the avatar still keeps walking until the user's foot goes back to the rest region, thus the user can control the movement of the avatar with simple steps.

Please note the arrangement for rest regions and the moving regions is not limited to the embodiment of FIG. 5A.

Figure 6:
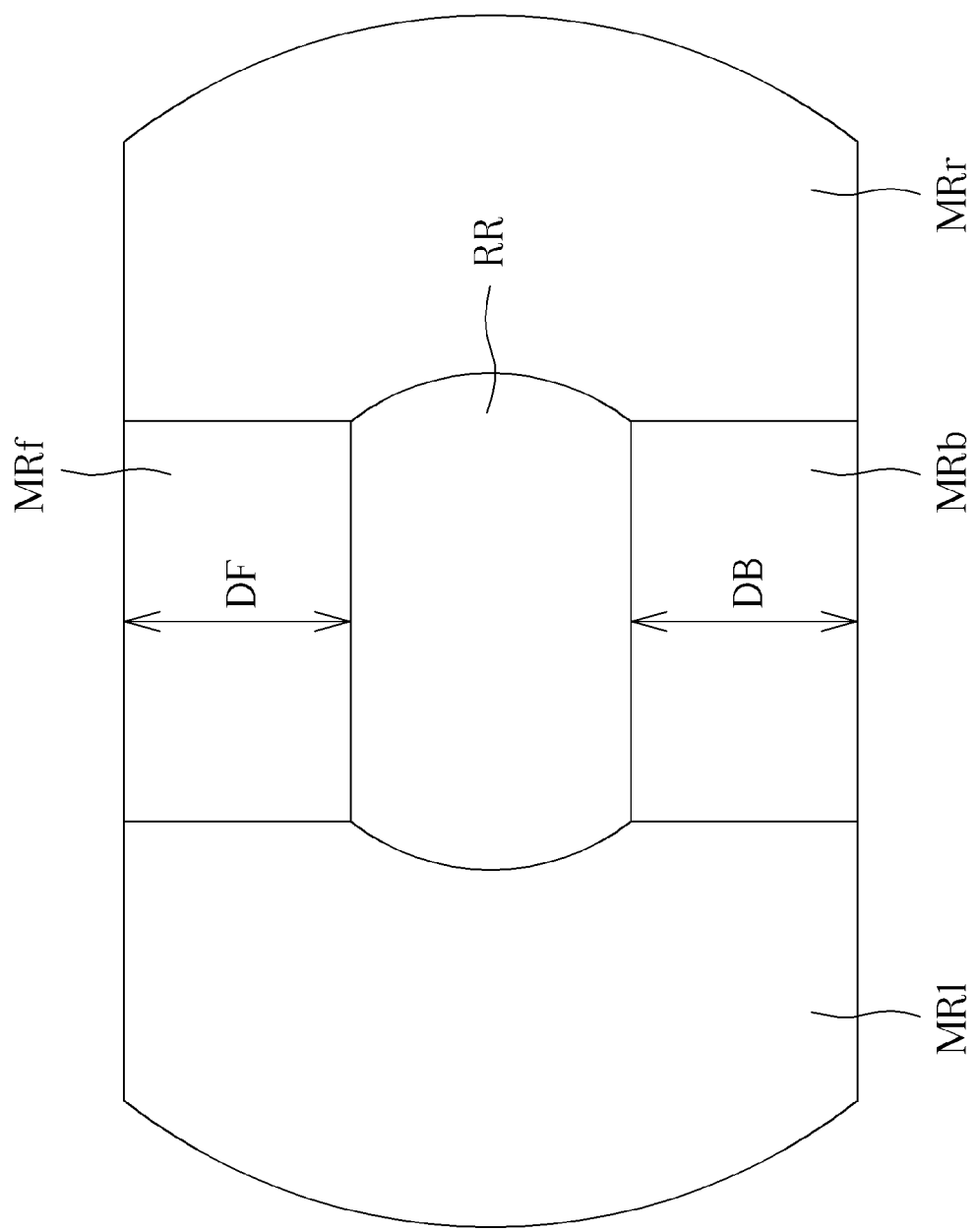
FIG. 6-FIG. 11 are schematic diagrams illustrating how to decide a moving speed level and a moving direction of the avatar according to different embodiments of the present application.

FIG. 6-FIG. 10 are schematic diagrams illustrating how to decide a moving speed level and a moving direction of the avatar according to different embodiments of the present application. In these embodiments, the moving deciding apparatus 105 decides the moving speed level according to a distance between the location of the first foot and the rest region. In FIG. 6, a moving forward speed coefficient MFC can be acquired by Equation (1):

$$\frac{\text{Fastest forward speed} - \text{Lowest forward speed}}{\text{Forward detect area vertical distance } (DF)} \quad \text{Equation (1)}$$

Accordingly, as shown in 7, a forward speed for the avatar SISf can be determined by Equation (2):

$$DFv*MFC \quad \text{Equation (2)}$$

DFv indicates a distance between the right foot Fr and the rest region RR. Please note the speed for the avatar SISf can be decided further referring to a pose of the user, which will be described later. A backward speed for the avatar can be decided following the same rules, thus is omitted for brevity here.

Figure 7:
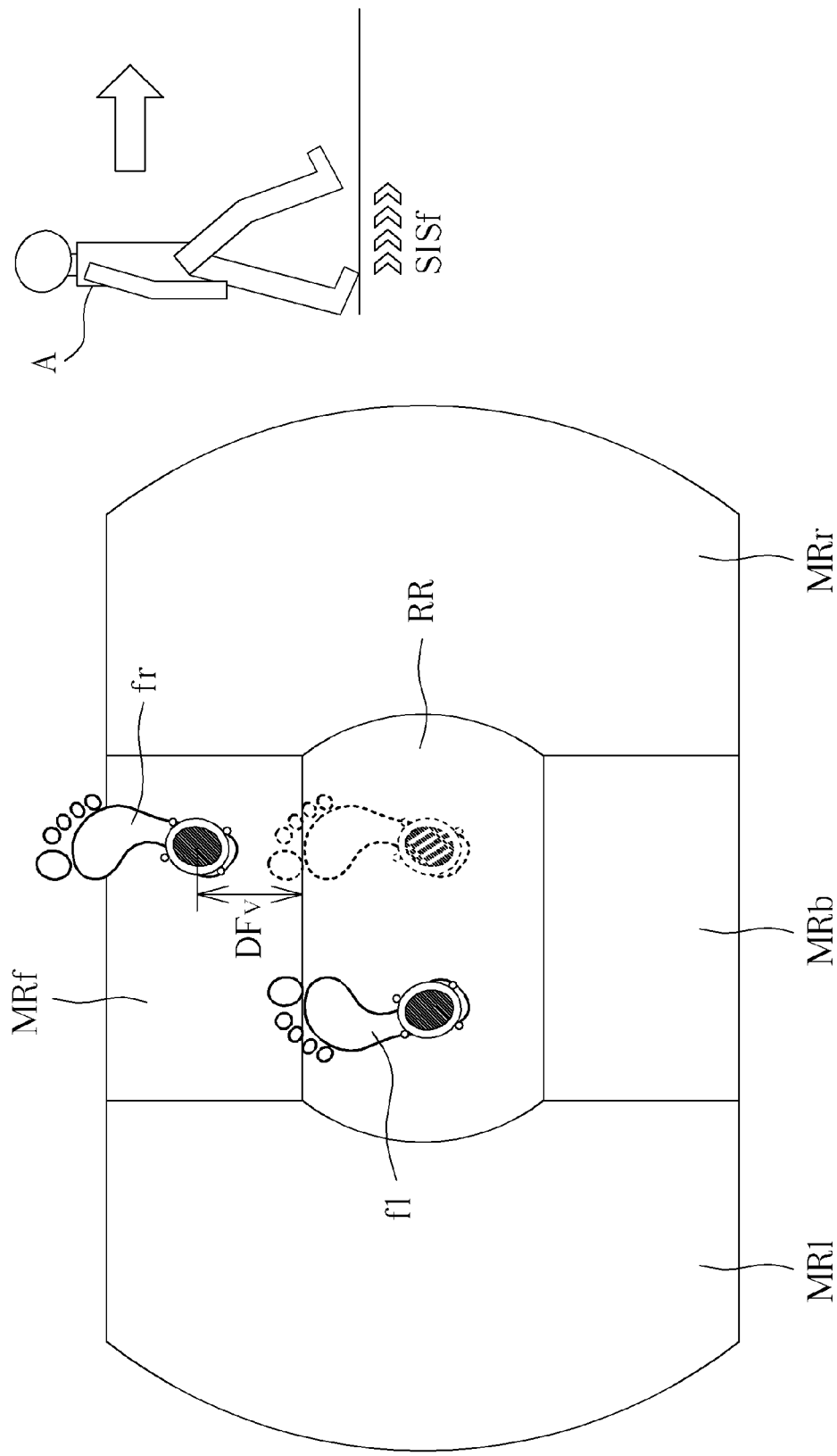

Please note the human type graph in the right half of FIG. 7 is a graph depicting the movement of an avatar A rather than the operation for the user. The human type graph in FIG. 7, FIG. 9, FIG. 11, FIG. 17, FIG. 18 and FIG. 19 depict the same thing.

Figure 8:
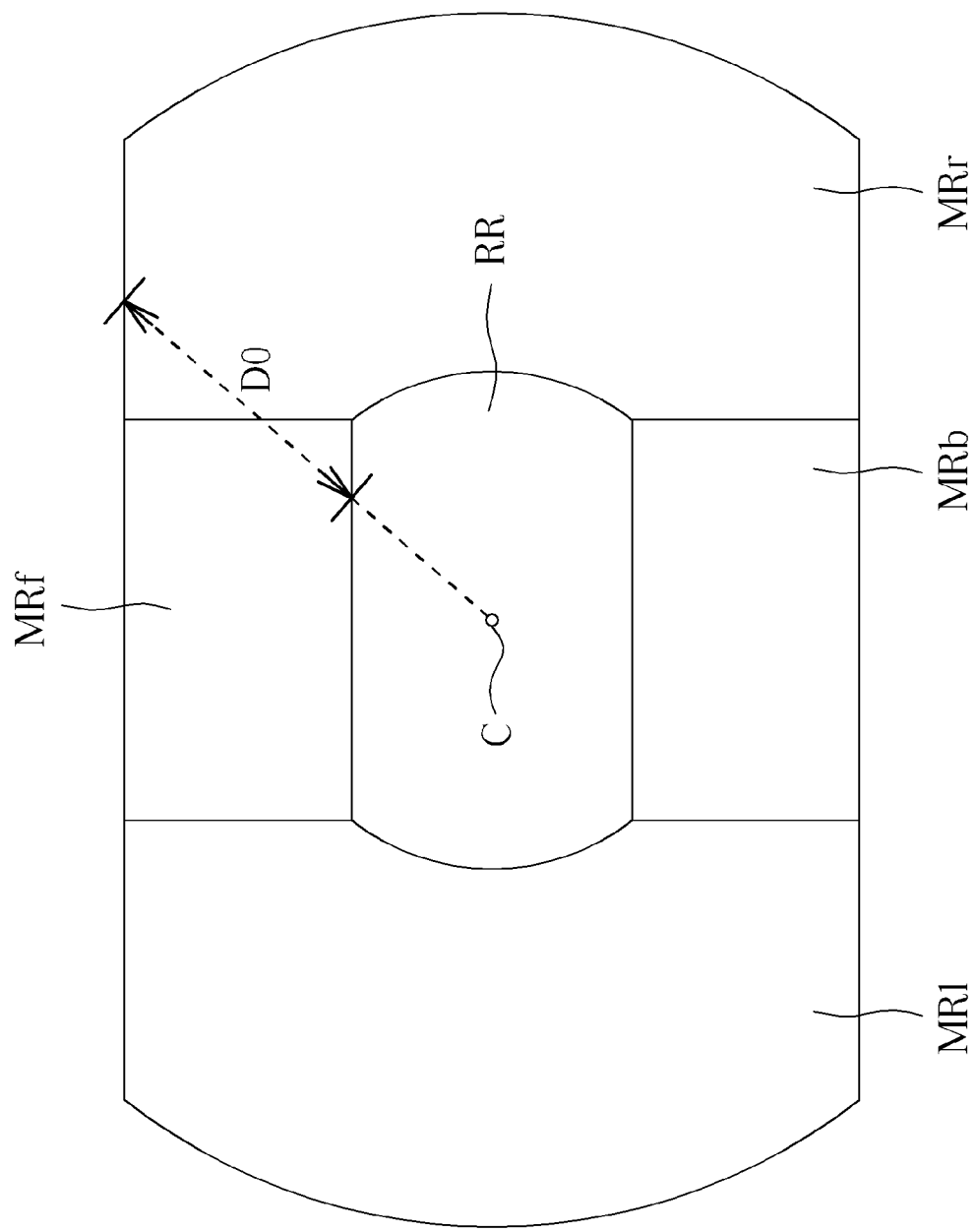
Figure 9:
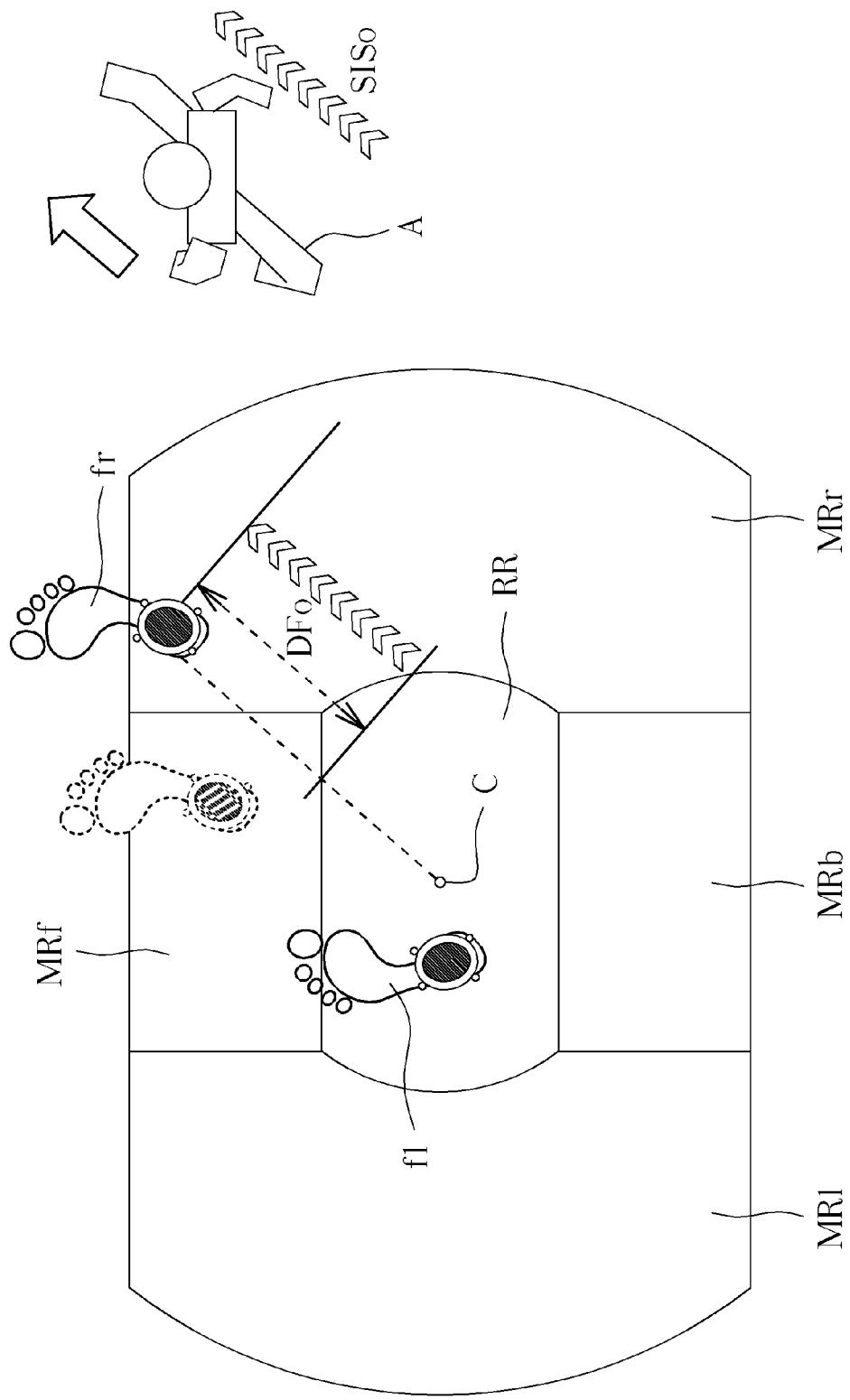

In FIG. 8, an oblique moving speed coefficient MOC can be acquired by Equation (3):

$$\frac{\text{Fastest oblique speed} - \text{Lowest oblique speed}}{DO} \quad \text{Equation 3}$$

DO indicate a length for a straight line in the moving region. The straight line has a predetermined angle from a horizontal line and points toward to a central point C.

Accordingly, as shown in 9, an oblique moving speed for the avatar SISo can be determined by Equation (4):

$$DFo*MOC \quad \text{Equation (4)}$$

DFo indicates a length for a straight line formed between the foot fr and the central point C in the affective moving region. The straight line has a predetermined angle from a horizontal line and points toward to a central point C. Please note the oblique moving speed for the avatar SISo can be decided further referring to a pose of the user, which will be described later.

Figure 10:
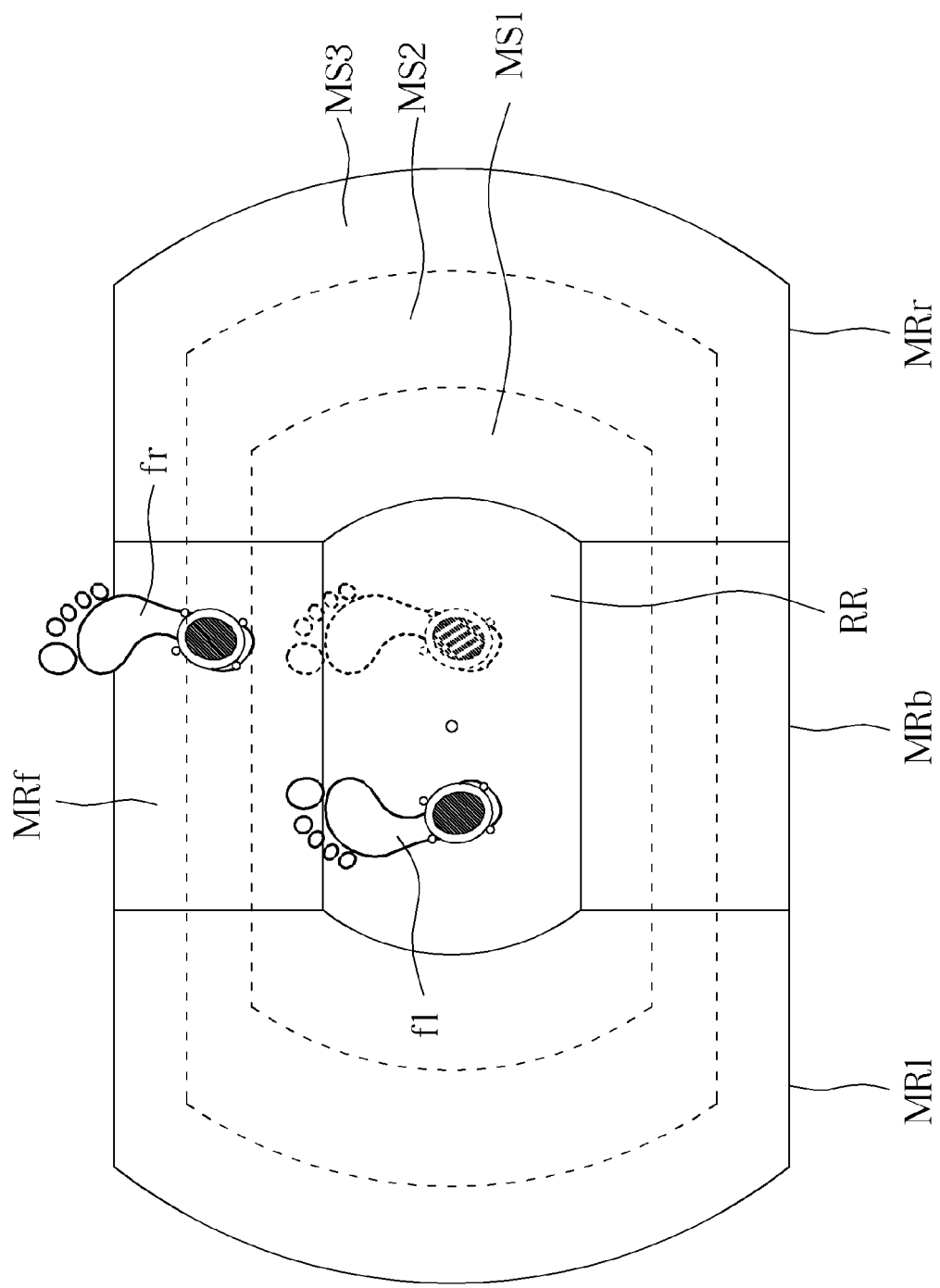

In the embodiment of FIG. 10, the moving regions respectively comprise a plurality of sub moving regions. In this example, three sub moving regions MS1, MS2 and MS3 are provided. The moving deciding apparatus 105 in FIG. 1 decides the moving speed level according to which one of the sub moving regions does the foot locate in. For example, if the right foot fr locates in the sub moving region MS1, the avatar has a first moving speed level, and if the right foot fr locates in the sub moving region MS2, the avatar has a second moving speed level larger than the first moving speed level.

Figure 11:
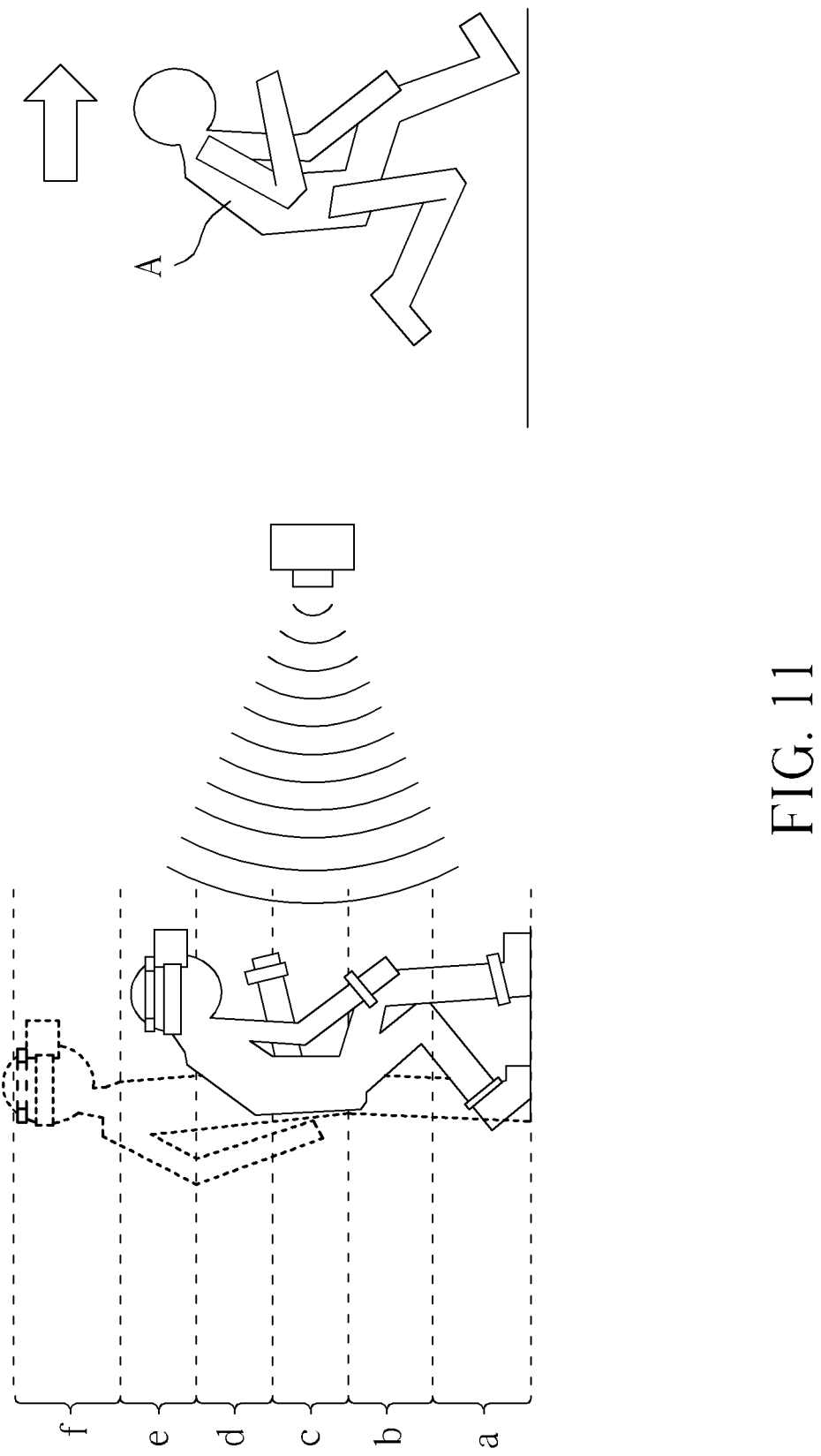

In the embodiment of FIG. 11, the body location determining apparatus 103 further detects a pose of the user according to body location information. For example, the body location determining apparatus 103 can detect the pose based on heights for the head and the hands to determine if the user is in a state of crouch. Also, the moving deciding apparatus 105 decides the moving speed for the avatar based on the pose. In one embodiment, if a height of the head is lower than a first height, the speed of the avatar is larger, since it means the user is running. However, if a height of the head is further lower than a second height smaller than the first height, the speed of the avatar becomes smaller since it means the user is moving with squatting.

Figure 12:
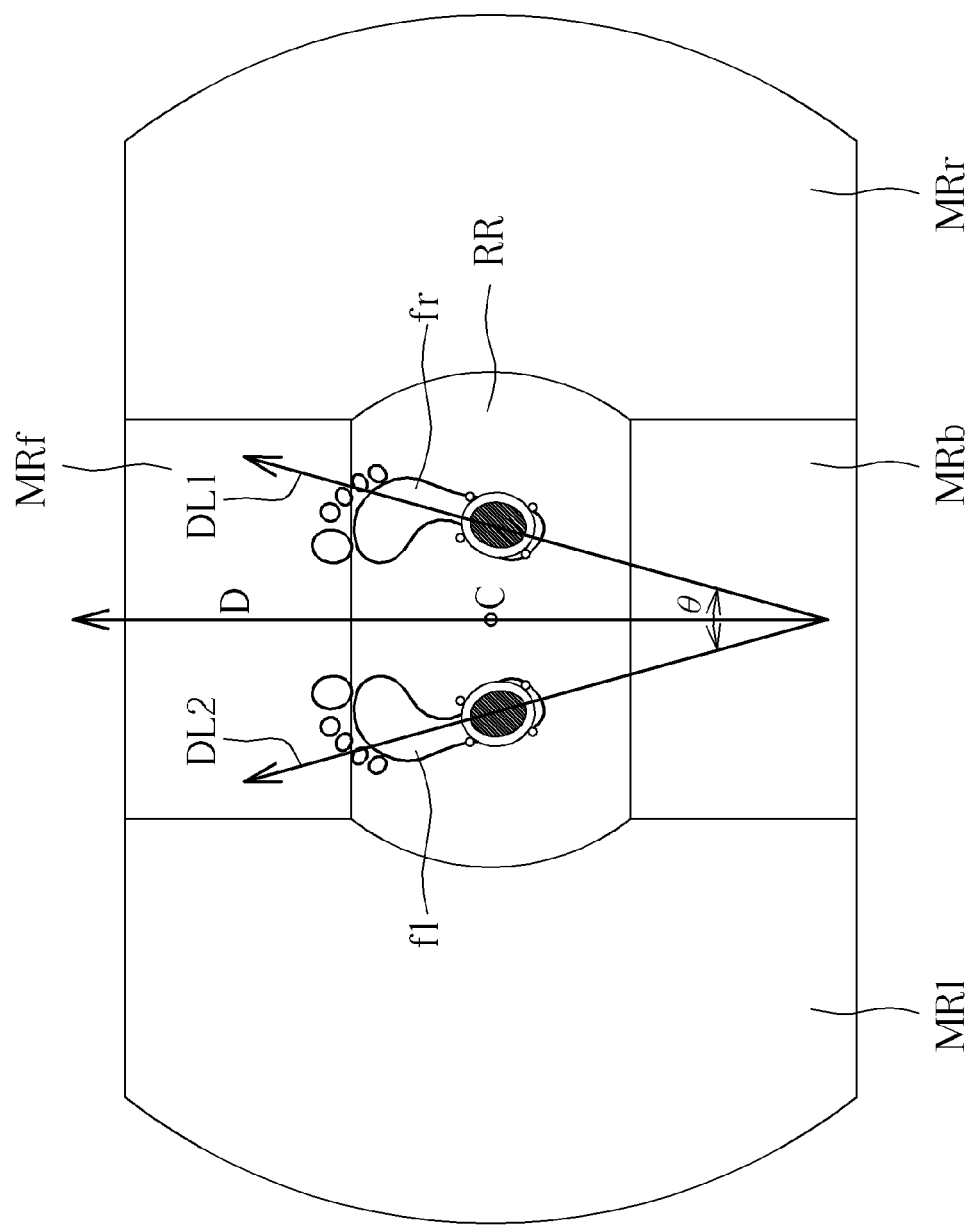

FIG. 12-FIG. 16 are schematic diagram illustrating how to decide the rest region and the moving regions according to different embodiments of the present invention. In the embodiment of FIG. 12, the body location determining apparatus 103 decides a first directional line DL1 across through a front end of a first foot (a right foot fr in this example) to a back end of the first foot, and determines a second directional line DL2 across through a front end of a second foot (a left foot fl in this example) of the user to a back end of the second foot. The body location determining apparatus 103 defines the rest region RR and the moving regions MRf, MRb, MRr, and MRl according to a cross angle θ of the first directional line DL1 and the second directional line DL2. In one embodiment, the body location determining apparatus 103 defines a face to direction D based on the cross angle θ, and accordingly defines the rest region RR and the moving regions MRf, MRb, MRr, and MRl. In one embodiment, the face to direction D is decides based on ½ θ. Also, the body location determining apparatus 103 can further define a central point C of the rest region RR according to the locations of the two feet. In one embodiment, the central point C is decided first, which is a central point of the rest region RR, and then the cross angle θ and the face to direction D are decided. After that, the moving regions MRf, MRb, MRr, and MRl are decided. However, please note this sequence is only for an example and does not mean to limit the scope of the present invention.

In one embodiment, the front end means the tips of toes or the tips of fingers, and the back end means the ankle or the wrist, depending on the user uses hands or feet. However, the front end and the back end can be set by the VR application program to any direction. For example, the front end and the back end can be set by the VR application program based on the convenience for the user to control the game.

Figure 13:
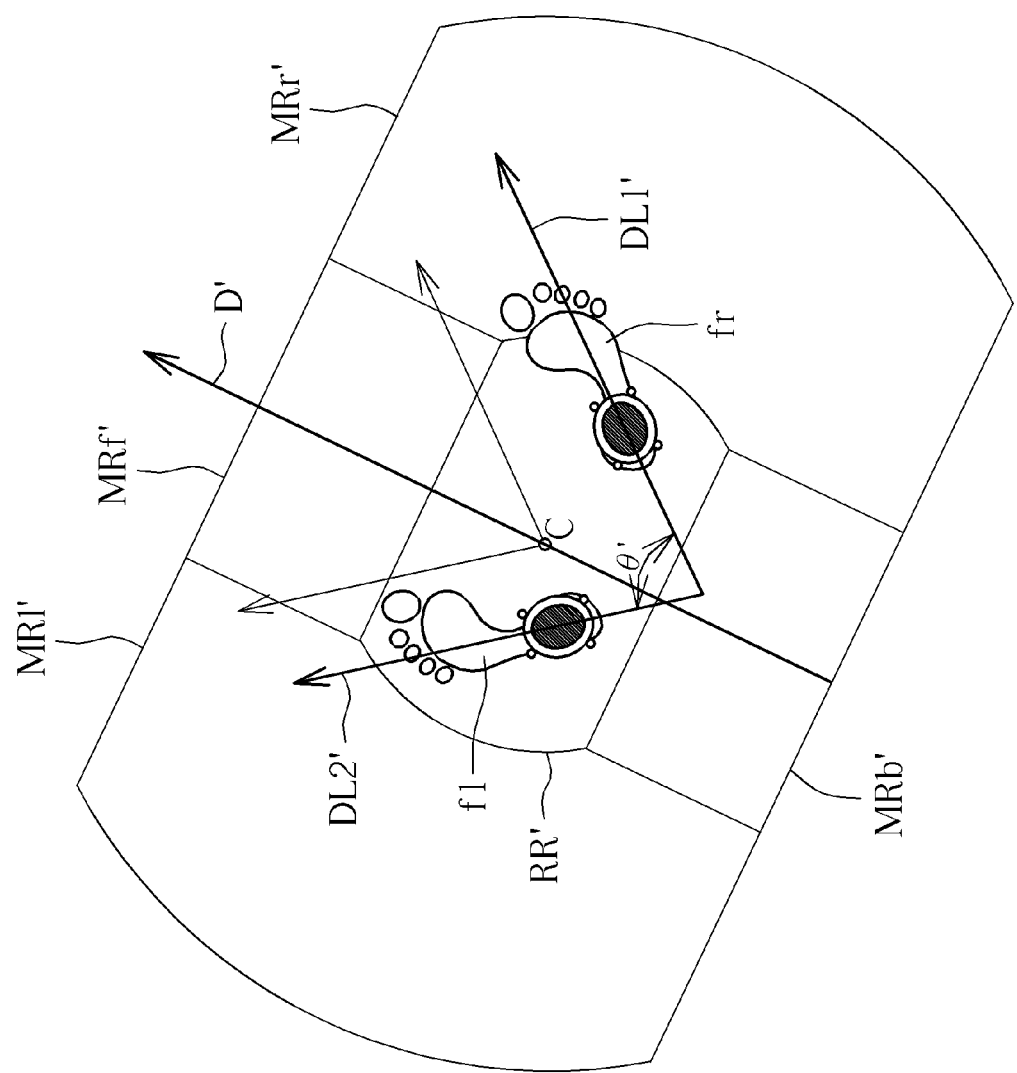

In the embodiment of FIG. 13, the user turns such that a new first directional line DL1' and a new second directional line DL2' are generated. Accordingly, a new cross angle θ' is generated and a new face to direction D' is generated based on the new cross angle θ'. Accordingly, the body location determining apparatus 103 defines a new rest region RR' and the moving regions MRf', MRb', MRr', and MRl' according to the new cross angle θ'. Please note the central point C can be set as movable or non-movable. In the embodiment of FIG. 13, the central point C is set as non-movable.

Figure 14:
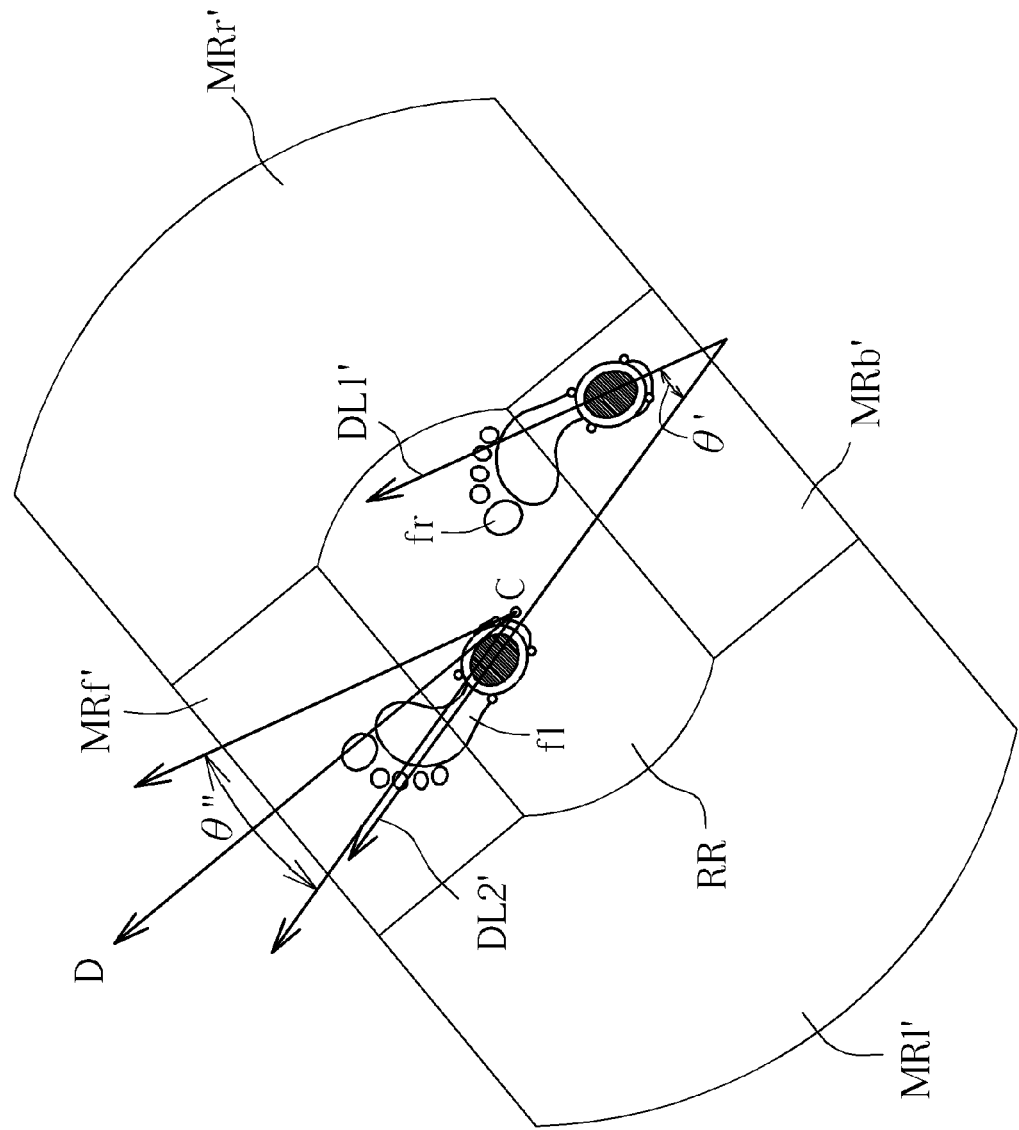

In FIG. 14, the right foot fr and the left foot fl turn such that the first directional line DL1 and the second directional line DL2 change to DL1' and DL2'. The cross angle θ' is generated according to the DL1' and DL2'. In this example, the central point C is also set as non-movable, and the cross angle θ' is moved to the central point C to generate a cross angle θ". The body location determining apparatus 103 defines the rest region and the moving regions according to the cross angle θ" and the face to direction D.

Furthermore, in the embodiment of FIG. 14, the right foot fr locates in the new moving region when turns. In such case, the moving deciding apparatus 105 does not change the moving speed level or the moving direction according to the location of the right foot fr, since the user puts his right foot in the moving region just because it turns and does not mean to move.

Figure 15:
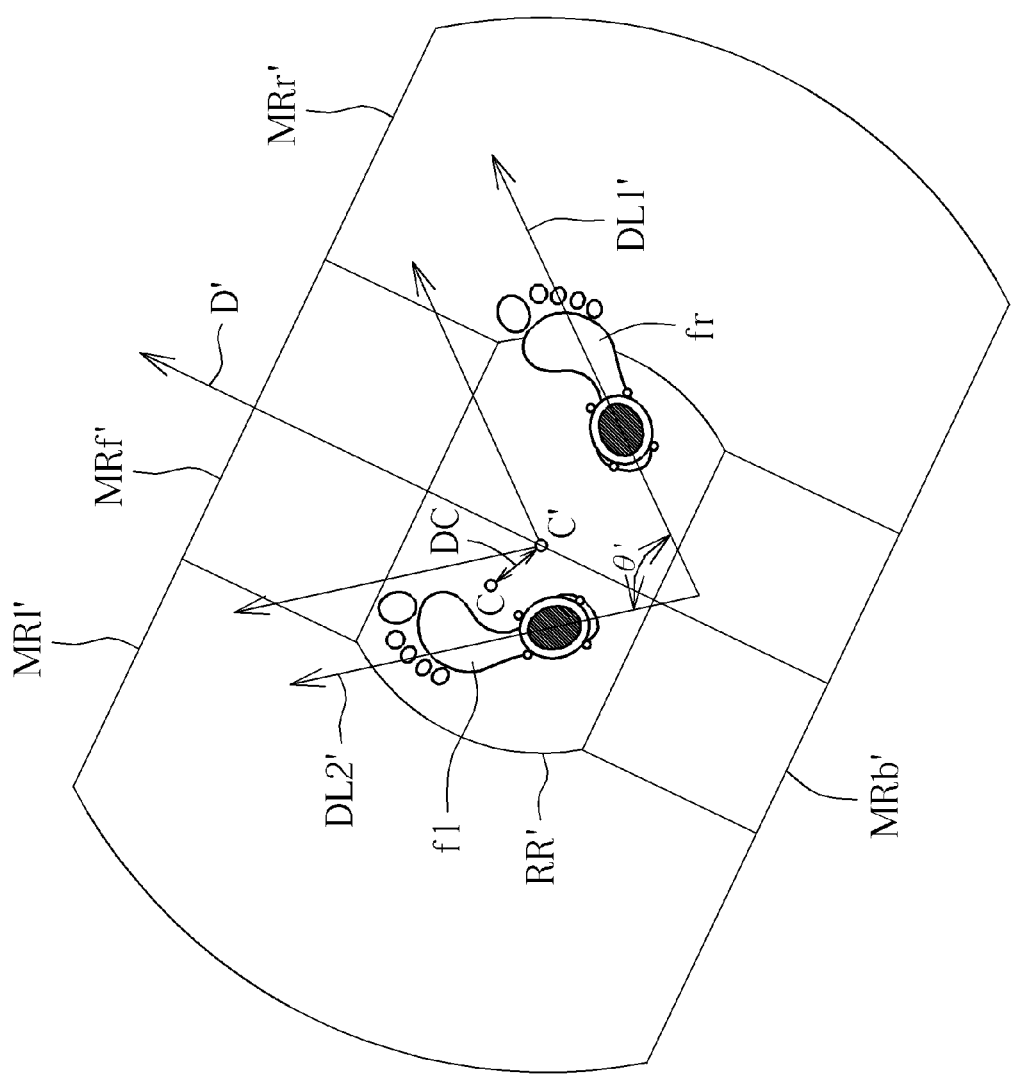

The embodiment in FIG. 15 is similar as which of FIG. 13. However, the central point in FIG. 15 is set as movable. In the embodiment of FIG. 15, the body location determining apparatus 103 decides a new central point according to following steps: (a) deciding a temporary central point according to new locations of the feet fr, fl; computing a distance DC between the central point C and the temporary central point; (b) setting the temporary central point as the new central point C' if the distance is smaller than a predetermined value (ex. 30 cm), and (c) setting a point having a predetermined distance (30 cm in this example) from the central point C in a direction from the central point C to the temporary central point as the central point C' if the distance is larger than the predetermined value.

Figure 16A:
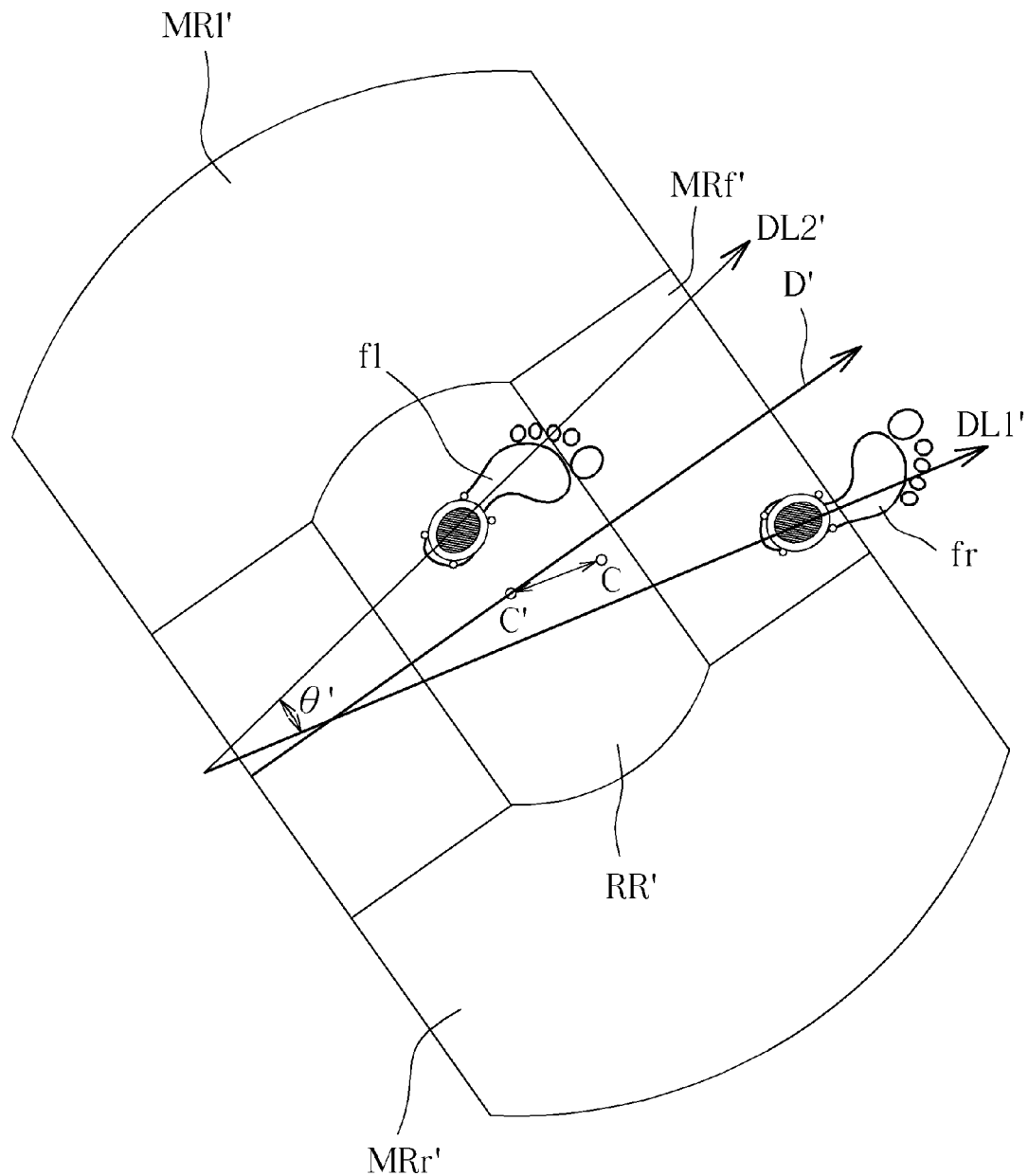

In the embodiment of FIG. 16A, the right foot fr locates in the moving region when the user turns. In such embodiment, if the second directional line DL2' does not change (i.e. the left foot fl does not move), the body location determining apparatus 103 does not change the central point. On the contrary, if the second directional line DL2' changes, the above-mentioned steps (a)-(c) are applied to determine a new central point C. Please note the cross angle θ' can be moved to the new central point C' to generate a cross angle θ", as stated in FIG. 14. In such case, the body location determining apparatus 103 defines the rest region and the moving regions according to the cross angle θ".

Figure 16B:
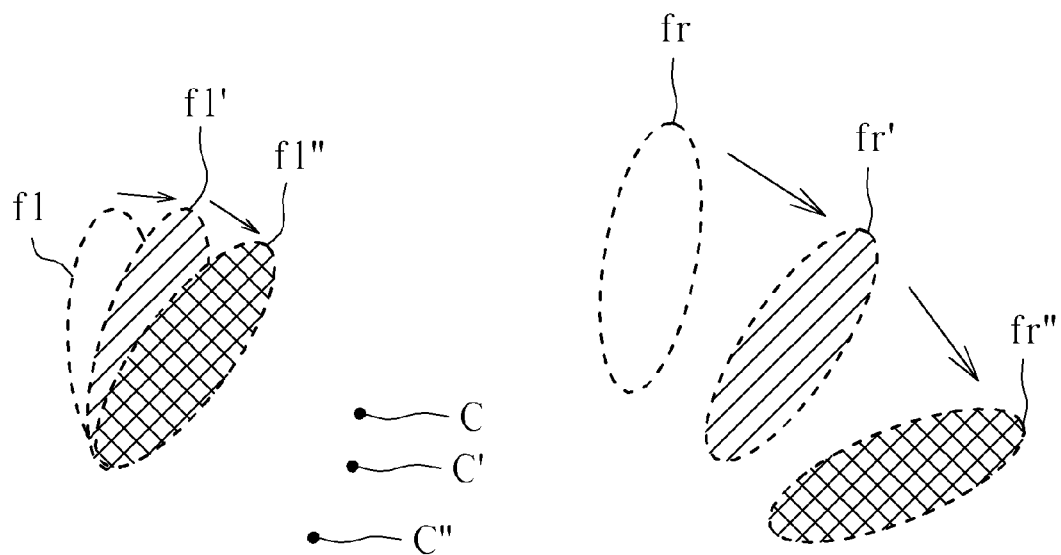
FIG. 16B and FIG. 16C are schematic diagrams for illustrating the embodiment in FIG. 16C for more detail.
Figure 16C:
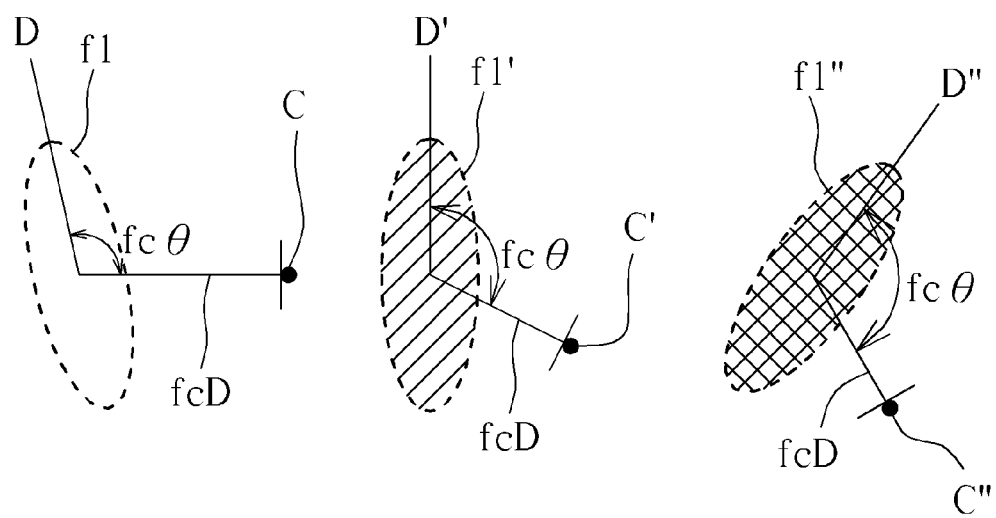

FIG. 16B and FIG. 16C are schematic diagrams for illustrating the embodiment in FIG. 16C for more detail. FIG. 16B is a schematic diagram illustrating a situation that the user stands at his left foot as a center to move his right foot in a clockwise direction. The fr, fr', fr" indicate different locations for the right foot, and the fl, fl', fl" indicate different locations for the left foot. The location fl corresponds to the location fr, the location fl' corresponds to the location fr', and the location fl" corresponds to the location fr". The central point changes corresponding to the locations of at least one foot.

FIG. 16C illustrates an example to compute central points. As shown in FIG. 16C, the central point C is firstly computed according to the location fr and fl. Also, the distance fcD between the directional line D for the left foot at the location fl and the central point C is acquired, and the cross angle fcθ between the central point C and the directional line D is acquired as well. Please note any point on the directional line D can be selected to compute the distance fcD and the cross angle fcθ. In one embodiment, the location of the body location sensing apparatus or the location of the heel is selected as the point to compute the distance fcD and the cross angle fcθ. After the left foot is changed to the location fl', a new central point C' is computed according to the distance fcD and the cross angle fcθ. In one example, the distance between the directional line D' for the left foot at the location fl' and the central point C' is still fcD, and the cross angle between the central point C' and the directional line D' is still fcθ. Following the same rule, the central point C" is acquired.

Please note the above-mentioned embodiments are not limited to feet. The embodiments can be applied to other limbs (such as hands) as well.

Figure 17:
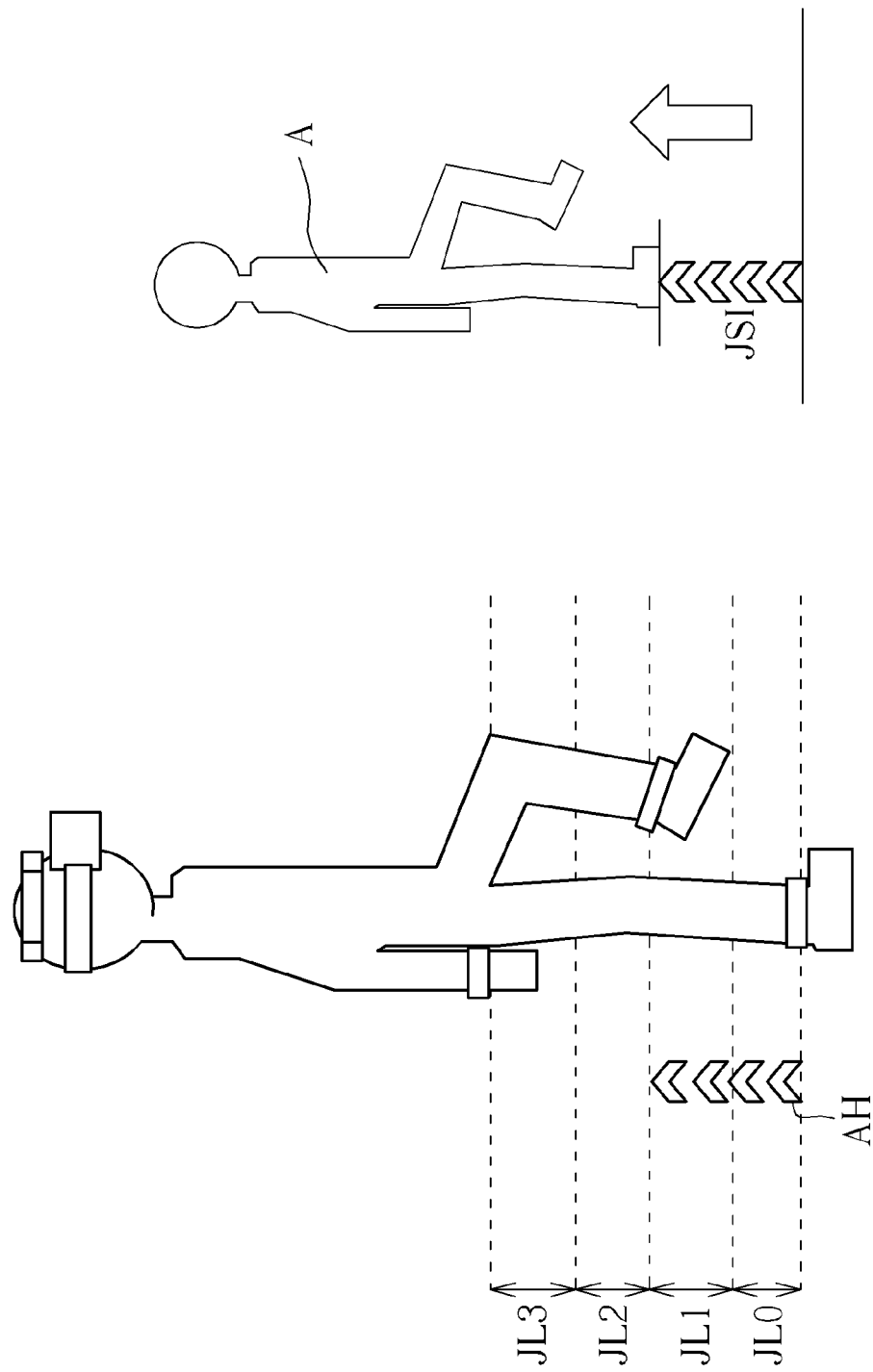
FIG. 17-FIG. 19 are schematic diagrams illustrating how the user controls different actions of the avatar, according to one embodiment of the present invention.
Figure 18:
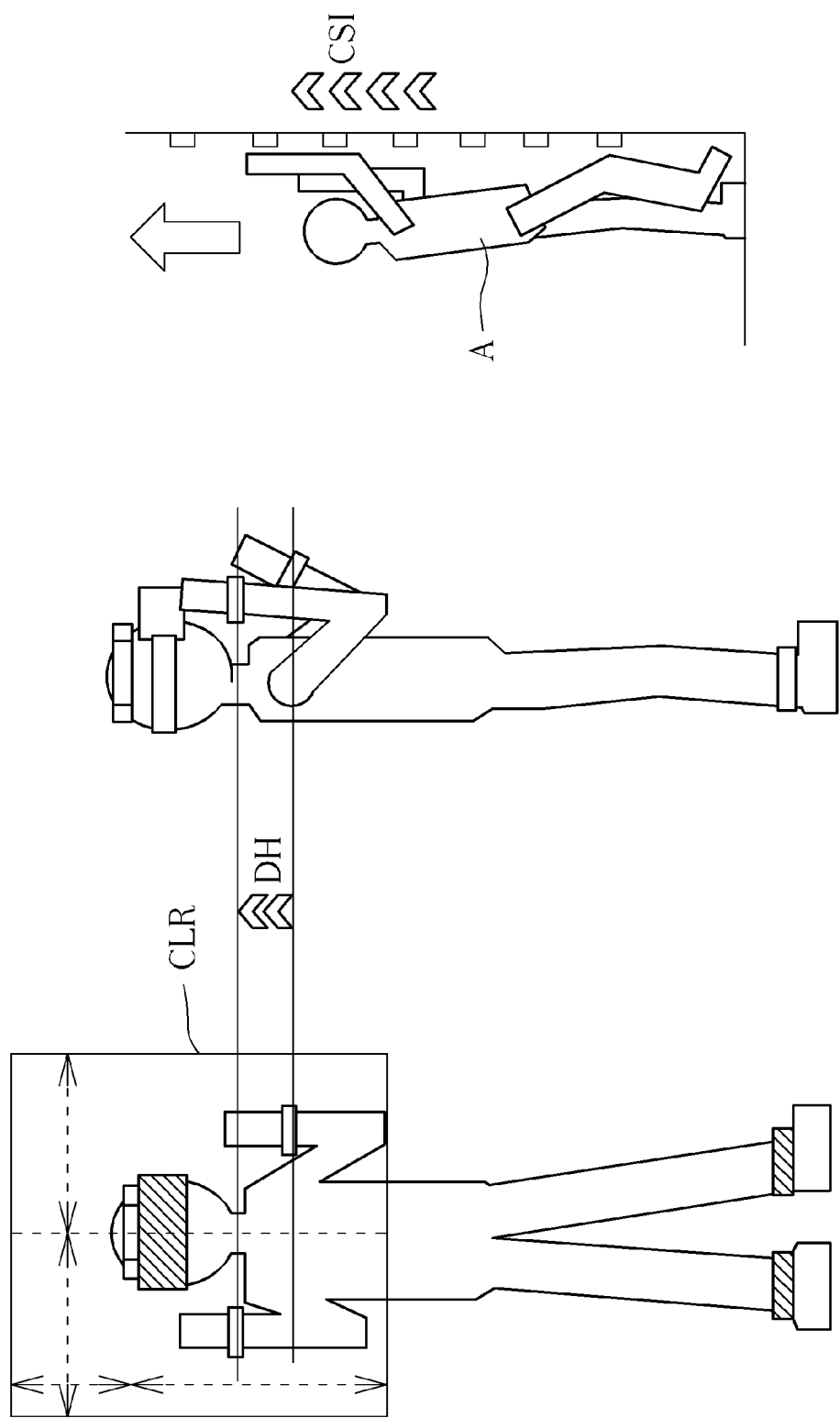
Figure 19:
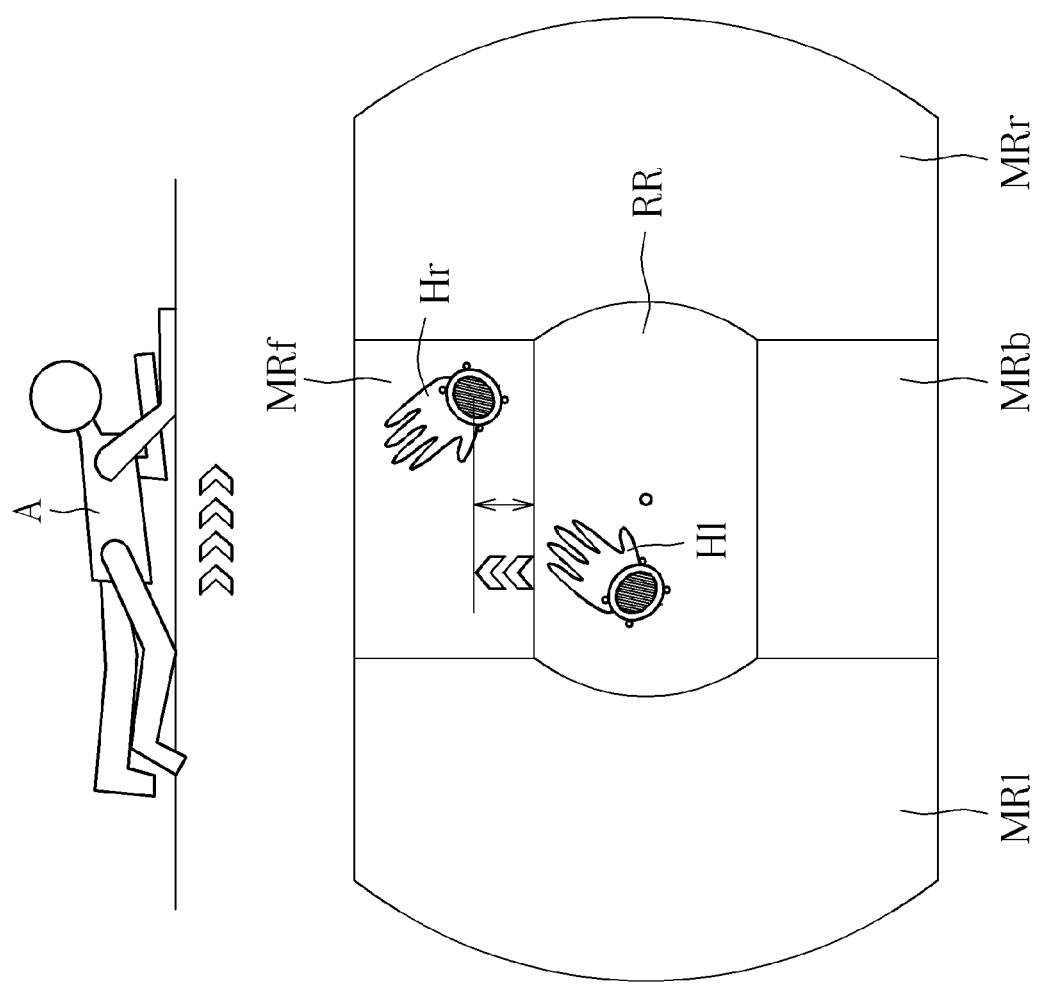

FIG. 17-FIG. 19 are schematic diagrams illustrating how the user controls different actions of the avatar, according to one embodiment of the present invention.

In the embodiment of FIG. 17, the body location determining apparatus 103 further computes a vertical distance between two feet (or the ankles). Then the moving deciding apparatus 105 decides a jumping speed or a jumping height (JSI) of the avatar according to the distance between the feet. In this example, the body location determining apparatus 103 defines several jumping regions JL0, JL1, JL2, and JL3, and decides a jumping speed or a jumping height (JSI) of the avatar according to which one of the jumping regions does the vertical distance fall in. In one embodiment, the body location determining apparatus 103 only decides the jumping speed or the jumping height only when a distance between the ground (or the ankle) is over a predetermined length, since the user may just want to move and does not want to jump.

In the embodiment of FIG. 18, the body location determining apparatus 103 further defines a climbing region CLR and detects a vertical distance DH between two hands in the climbing region CLR. The moving deciding apparatus 105 decides a climbing speed (CSI) of the avatar according to the vertical distance between two hands in the climbing region CLR. In one embodiment, the moving deciding apparatus 105 only decides a climbing speed if the vertical distance between two hands is larger than a predetermined length. By this way, the vrat control system will not be too sensitive. Also, the climbing region CLR can comprise a rest region and a plurality of moving regions, as depicted in FIG. 5A. Further, the climbing region CLR can be classified to be a plurality of sub climbing regions, and the climbing speed can be decided depending on which region does the hand locate in, as shown in FIG. 10. In one embodiment, the moving deciding apparatus 105 decides a climbing direction according to the moving direction of the moving hand. For example, if the user moves one of his hands up, the moving deciding apparatus 105 decides the user is climbing up. On the opposite, if the use moves one of his hands down, the moving deciding apparatus 105 decides the user is climbing down.

Please note, the embodiment in FIG. 5A can also be applied to the embodiment of FIG. 18. That is, a rest region and moving regions can be provided, and the climbing direction/speed can be decided according to the location of the hand (in the rest region or moving regions).

In the embodiment of FIG. 19, the body location determining apparatus 103 defines a rest region and a plurality of moving regions MRf, MRb, MRr and MRl, and determines a location for at least one hand of the user according to the body location information. If at least the hand is in the rest region, the moving deciding apparatus 105 decides the avatar has a first crawling speed (0 in this example). If at least the hand is in the moving region, the moving deciding apparatus 105 decides the avatar has a second crawling speed larger than the first crawling speed. For example, if the right hand Hr is in the moving forward region, the avatar will crawl forward. In this embodiment, the locations and the sizes of the rest region and the moving regions can be decided according to user's body shape via the body location determining apparatus 103, or set by the user. Additionally, the central point for two hands of the user and the central point for feet of the user is limited in a predetermined range, which can be automatically set by the body location determining apparatus 103 or set by the user. By this way, the user can be safer.

Figure 20:
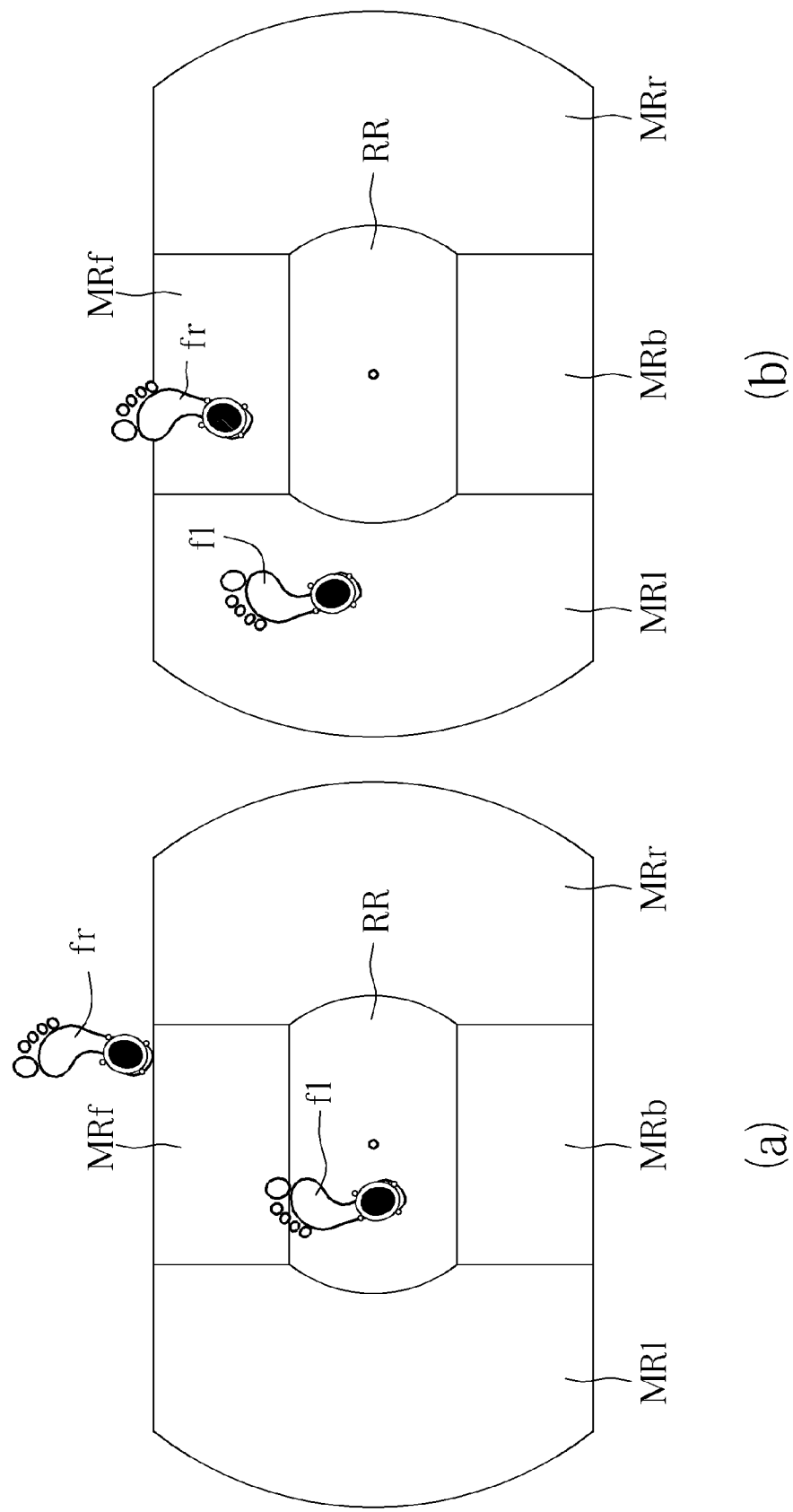
FIG. 20-FIG. 21 are schematic diagrams illustrating protection mechanisms according to embodiments of the present invention.
Figure 21:
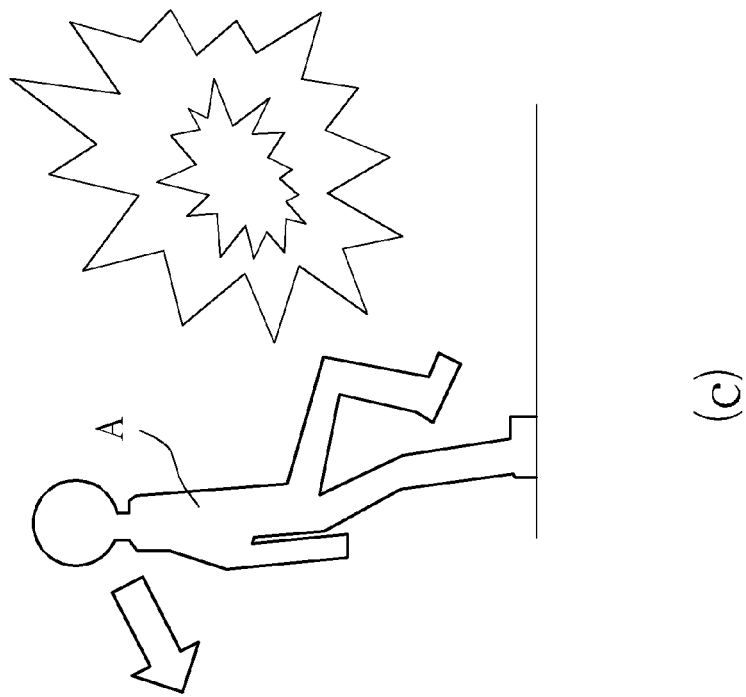
Figure 21:
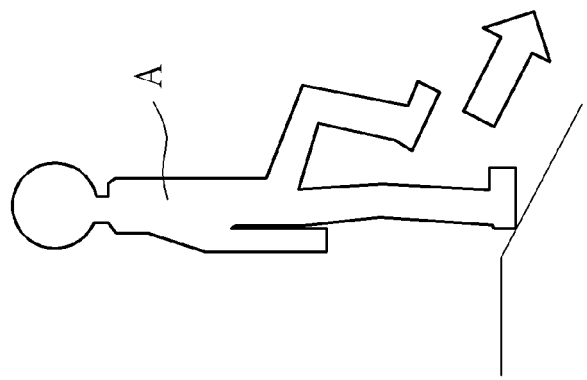
Figure 21:
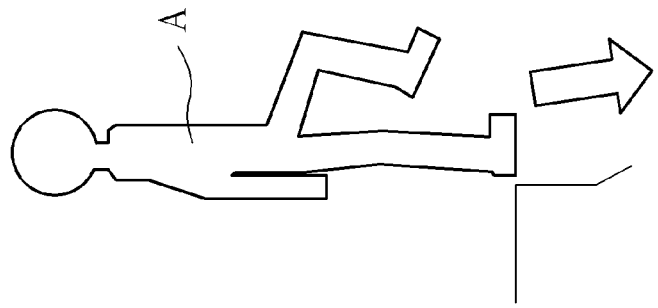

FIG. 20-FIG. 21 are schematic diagrams illustrating protection mechanisms according to embodiments of the present invention. As depicted in FIG. (a) and FIG. (b) of FIG. 20, the right foot fr is in a region besides the rest region RR and moving regions MRf, MRb, MRr and MRl, thus the vrat control system suspends the VR application program being executed or pauses the game time. In one embodiment, the user wears a head mount display, and the head mount display stops displaying the virtual world and displays the real environment if the program is executed. Via such mechanism, the user can be prevented from going to a dangerous place if he wears a head mount display to play a game.

In the embodiment of FIG. 21, if the simulating image processing apparatus 107 detects that the avatar will be out-off-balance in a virtual world generated by a game program while the vrat control system executing the game program, the vrat control system suspends the game program. For example, in FIG. (a) of FIG. 21 the avatar A drops, in FIG. (b) of FIG. 21 the avatar A slides, and in FIG. (c) the avatar A is near an explosion. In such cases, the user playing the game may suffer a feeling of non-balance since the avatar A is in the condition of non-balance, thus the vrat control system suspends the game program to avoid falling down of the user. In one embodiment, the user wears a head mount display. The head mount display stops displaying the virtual world and displays the real environment if the game program is suspended. By this way, the user may regain the balance.

In one embodiment, after the vrat control system suspends the game program, the vrat control system continues the game program if the body location determining apparatus 103 determines the user performs a specific body motion according to the body location information. For example, after the vrat control system suspends the game program, the vrat control system continues the game program if the user squats down and touches the ground to regain the balance.

Figure 22:
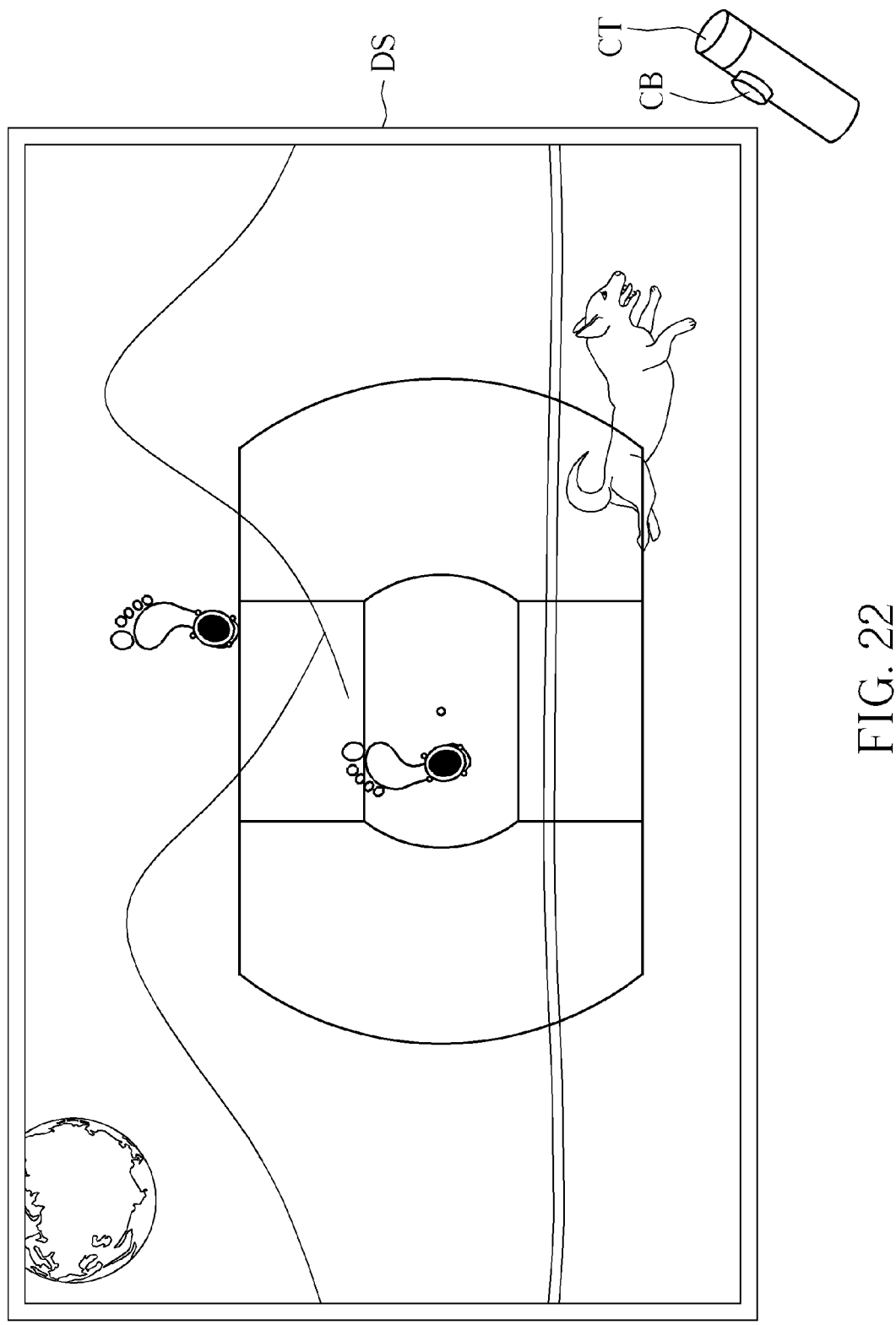
FIG. 22 is a schematic diagram illustrating how to display various information on the display.

FIG. 22 is a schematic diagram illustrating how to display various information on the display. In FIG. 22, if the user keeps pressing a confirm button CB provided on the controller CT, or the vrat control system suspends the program, the display DS display various information thereon. For example, the display DS can display the rest region, the moving regions, or the climbing region. In another example, the climbing region is displayed if a game program is executed and the avatar is close to something that can be climbed. In such example, the locations for hands can also be displayed.

Please note the embodiments in FIG. 17-FIG. 21 are not limited to be combined with the embodiments illustrated in FIGS. 1-16. For example, the vrat control system 100 can comprise only the body location determining apparatus 103 to perform the embodiments depicted in FIG. 20 and FIG. 21. Also, the moving deciding apparatus 105 can only decide the jumping speed/height, the climbing speed and the crawling speed respectively in FIG. 17-19, but does not decide the moving speed level/direction according to locations of the feet.

Based on above-mentioned embodiments, a vrat control method can be acquired, which comprises following steps: (a) generating body location information according to body locations of a user; (b) computing a location for a first limb of the user according to the body location information; and (c) deciding a moving speed level and a moving direction of an avatar according to the location for the first limb to generate at least one moving parameter. Other detail steps can be acquired based on above-mentioned embodiments, thus are omitted for brevity here.

In view of above-mentioned embodiments, the user can control the avatar much more effectively. Additionally, the protection mechanism can help the user to avoid going to a dangerous place or falling down.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A virtual reality avatar traveling control system, comprising:
    at least one body location sensing apparatus, for providing body location information according to body locations of a user;
    a body location determining apparatus, for computing a location for a first limb of the user according to the body location information; and
    a moving deciding apparatus, for deciding a moving speed level and a moving direction of an avatar according to the location for the first limb, to thereby generate at least one moving parameter;
    wherein the body location determining apparatus defines a first limb rest region and a plurality of first limb moving regions;
    wherein the body location determining apparatus defines a second limb rest region and a plurality of second limb moving region;
    where if the first limb of the user is in the first limb rest region, the moving deciding apparatus decides the avatar has a first moving speed;

wherein if the first limb is in the first limb moving region, the moving deciding apparatus decides the avatar has a moving direction corresponding to which one of the first limb moving regions does the first limb locate in;

where if the second limb of the user is in the second limb rest region, the moving deciding apparatus decides the avatar has a third moving speed;

wherein if the second limb is in the second limb moving region, the moving deciding apparatus decides the avatar has a moving direction corresponding to which one of the second limb moving regions does the second limb locate in.

2. The virtual reality avatar traveling control system of claim 1, wherein the body location determining apparatus and the moving deciding apparatus are integrated to a single apparatus.

3. The virtual reality avatar traveling control system of claim 2, if the simulating image processing apparatus detects that the avatar will be out-off-balance in a virtual world generated by a game program while the virtual reality avatar traveling control system executing the game program, the virtual reality avatar traveling control system suspends the game program.

4. The virtual reality avatar traveling control system of claim 3, after the virtual reality avatar traveling control system suspends the game program, the virtual reality avatar traveling control system continues the game program if the body location determining apparatus determines the user performs a specific body motion according to the body location information.

5. The virtual reality avatar traveling control system of claim 1, further comprises:
a simulating image processing apparatus, for generating the simulating image according to the body location information and the moving parameter.

6. The virtual reality avatar traveling control system of claim 1, wherein at least one of the first limb moving region is overlapped with at least one of the second limb moving region.

7. The virtual reality avatar traveling control system of claim 1,
wherein the body location determining apparatus defines a rest region and a plurality of moving region;
where if the first limb and a second limb of the user are in the rest region, the moving deciding apparatus decides the avatar has a first moving speed;
wherein if the first limb is in the moving region, the moving deciding apparatus decides the avatar has a moving direction corresponding to which one of the moving regions does the first limb locate in.

8. The virtual reality avatar traveling control system of claim 7, wherein the moving deciding apparatus decides the moving speed level according to a distance between the location of the first limb and the rest region.

9. The virtual reality avatar traveling control system of claim 7, wherein the moving regions respectively comprises a plurality of sub moving regions, wherein the moving deciding apparatus decides the moving speed level according to which one of the sub moving regions does the first limb locate in.

10. The virtual reality avatar traveling control system of claim 7, wherein the body location determining apparatus decides a first directional line across through a front end of the first limb to a back end of the first limb, and decides a second directional line across through a front end of a second limb of the user to a back end of the second limb, wherein the body location determining apparatus defines the rest region and the moving regions according to a first cross angle of the first directional line and the second directional line.

11. The virtual reality avatar traveling control system of claim 10, wherein if the first limb or the second limb falls into one of the moving regions while the first directional line or the second directional line changes, the moving deciding apparatus does not change the moving speed level or the moving direction according to the location of the first limb or the second limb.

12. The virtual reality avatar traveling control system of claim 11, wherein the body location determining apparatus further decides a first central point of rest region, wherein the body location determining apparatus further decides a second central point after the first limb or the second limb moves via following steps:
(a) deciding a temporary central point according to new locations of the first limb and the second limb;
(b) computing a distance between the first central point and the temporary central point;
(c) setting the temporary central point as the second central point if the distance is smaller than a predetermined value, and setting a point having a predetermined distance from the first central point in a direction from the first central point to the temporary central point as the second central point if the distance is larger than the predetermined value.

13. The virtual reality avatar traveling control system of claim 12,
wherein if the first limb leaves the rest region and the second directional line does not change, the body location determining apparatus decides the first central point as the second central point;
wherein if the first limb leaves the rest region and the second directional line changes, the body location determining apparatus performs the steps (a)-(c) to decide the second central point.

14. The virtual reality avatar traveling control system of claim 10,
wherein the body location determining apparatus further decides a central point for the rest region, defines a second cross angle after the first directional line or the second directional line changes, and moves the second cross angle to the central point to generate a third cross angle;
wherein the body location determining apparatus defines the rest region and the moving regions according to the third cross angle.

15. The virtual reality avatar traveling control system of claim 10,
wherein if the first limb leaves the rest region and the second directional line does not change, the body location determining apparatus decides the first central point as the second central point;
wherein if the first limb leaves the rest region and the second directional line changes to generate a third directional line, the following steps are performed to generate a second central point:
computing a first distance between the first central point and the second directional line;
computing a first cross angle between the first central point and the second directional line; and
deciding the second central point, such that a second distance between the second central point and the third directional line is the same as the first distance, and a second cross angle between the second central point and the third directional line is the same as the first cross angle.

16. The virtual reality avatar traveling control system of claim 7, wherein if the first limb locates at a region besides the rest region and the moving regions when the virtual reality avatar traveling control system executes a program, the virtual reality avatar traveling control system suspends the program.

17. The virtual reality avatar traveling control system of claim 1, wherein the body location determining apparatus further computes a pose of the user according to the body location information, wherein the moving deciding apparatus further decides the moving speed level according to the pose.

18. The virtual reality avatar traveling control system of claim 1, wherein the first limb is a first foot,
wherein the body location determining apparatus further computes a vertical distance between the first limb and a second foot of the user; and
wherein the moving deciding apparatus decides a jumping speed or a jumping height of the avatar according to the distance between the first limb and the second foot.

19. The virtual reality avatar traveling control system of claim 18, wherein the moving deciding apparatus decides the jumping speed or the jumping height only when a distance between the first limb and the ground, or a distance between the second foot and the ground is larger than a predetermined length.

20. The virtual reality avatar traveling control system of claim 1,
wherein the body location determining apparatus further defines a climbing region and detects a vertical distance between two hands in the climbing region; and
wherein the moving deciding apparatus decides a climbing speed of the avatar according to the vertical distance between two hands in the climbing region.

21. The virtual reality avatar traveling control system of claim 20, wherein the moving deciding apparatus decides the climbing speed only if the vertical distance between two hands is larger than a predetermined length.

22. A virtual reality avatar traveling control method, applied to a virtual reality avatar traveling control system, comprising:
(a) generating body location information according to body locations of a user;
(b) computing a location for a first limb of the user according to the body location information;
(c) deciding a moving speed level and a moving direction of an avatar according to the location for the first limb, to thereby generate at least one moving parameter;
defining a first limb rest region and a plurality of first limb moving regions; and
defining a second limb rest region and a plurality of second limb moving region;
where if the first limb of the user is in the first limb rest region, deciding the avatar has a first moving speed;
wherein if the first limb is in the first limb moving region, the deciding the avatar has a moving direction corresponding to which one of the first limb moving regions does the first limb locate in and has a second moving speed;
where if the second limb of the user is in the second limb rest region, deciding the avatar has a third moving speed;
wherein if the second limb is in the second limb moving region, deciding the avatar has a moving direction corresponding to which one of the second limb moving regions does the second limb locate in.

23. The virtual reality avatar traveling control method of claim 22, further comprising:
(d) generating the simulating image according to the body location information and the moving parameter.

24. The virtual reality avatar traveling control method of claim 23, if the avatar is determined to be out-off-balance in a virtual world generated by a game program while the virtual reality avatar traveling control system executing the game program, suspending the game program.

25. The virtual reality avatar traveling control method of claim 24, after suspending the game program, continues the game program if the step (c) determines the user performs a specific body motion according to the body location information.

26. The virtual reality avatar traveling control method of claim 22, wherein at least one of the first limb moving region is overlapped with at least one of the second limb moving region.

27. The virtual reality avatar traveling control method of claim 22, wherein the step (c) comprises:
defining a rest region and a plurality of moving region;
if the first limb and a second limb of the user are in the rest region, deciding the avatar has a first moving speed level;
if the first limb is in the moving region, deciding the avatar has a moving direction corresponding to which one of the moving regions does the first limb locate in.

28. The virtual reality avatar traveling control method of claim 27, wherein the step (c) further comprises: deciding the moving speed level according to a distance between the location of the first limb and the rest region.

29. The virtual reality avatar traveling control method of claim 27, wherein the moving regions respectively comprises a plurality of sub moving regions, wherein the step (c)decides the moving speed level according to which one of the sub moving regions does the first limb locate in.

30. The virtual reality avatar traveling control method of claim 27, further comprising:
deciding a first directional line across through a front end of the first limb to a back end of the first limb, and deciding a second directional line across through a front end of a second limb of the user to a back end of the second limb, wherein the step (c) defines the rest region and the moving regions according to a first cross angle of the first directional line and the second directional line.

31. The virtual reality avatar traveling control method of claim 30, wherein if the first limb or the second limb falls into one of the moving regions while the first directional line or the second directional line changes, the step (d)does not change the moving speed level or the moving direction according to the location of the first limb or the second limb.

32. The virtual reality avatar traveling control method of claim 31, wherein the step (c) further decides a first central point of rest region, wherein the step (c)further decides a second central point after the first limb or the second limb moves via following steps:
(e) deciding a temporary central point according to new locations of the first limb and the second limb;
(f) computing a distance between the first central point and the temporary central point;
(g) setting the temporary central point as the second central point if the distance is smaller than a predetermined value, and setting a point having a predetermined distance from the first central point in a direction from the first central point to the temporary central point as the second central point if the distance is larger than the predetermined value.

33. The virtual reality avatar traveling control method of claim 32,
wherein if the first limb leaves the rest region and the second directional line does not change, the step(c) decides the first central point as the second central point;
wherein if the first limb leaves the rest region and the second directional line changes, the step(c)performs the steps (e)-(g) to decide the second central point.

34. The virtual reality avatar traveling control method of claim 30,
wherein the step (c)further decides a central point for the rest region, defines a second cross angle after the first directional line or the second directional line changes, and moves the second cross angle to the central point to generate a third cross angle;
wherein the step (c)defines the rest region and the moving regions according to the third cross angle.

35. The virtual reality avatar traveling control method of claim 30, further comprising:
if the first limb leaves the rest region and the second directional line does not change, deciding the first central point as the second central point;
if the first limb leaves the rest region and the second directional line changes to generate a third directional line, performing the following steps are performed to generate a second central point:
computing a first distance between the first central point and the second directional line;
computing a first cross angle between the first central point and the second directional line; and
deciding the second central point, such that a second distance between the second central point and the third directional line is the same as the first distance, and a second cross angle between the second central point and the third directional line is the same as the first cross angle.

36. The virtual reality avatar traveling control method of claim 27, wherein if the first limb locates at a region besides the rest region and the moving regions when the virtual reality avatar traveling control system executes a VR application program, suspending the VR application program.

37. The virtual reality avatar traveling control method of claim 22, wherein the step(c) further computes a pose of the user according to the body location information, wherein the step (d) further decides the moving speed level according to the pose.

38. The virtual reality avatar traveling control method of claim 22,
wherein the step(c) further computes a vertical distance between the first limb and a second limb of the user; and
wherein the step (d) decides a jumping speed or a jumping height of the avatar according to the distance between the first limb and the second limb.

39. The virtual reality avatar traveling control method of claim 38, wherein the step (c) decides the jumping speed or the jumping height only when a distance between the first limb and the ground, or a distance between the second foot and the ground is larger than a predetermined length.

40. The virtual reality avatar traveling control method of claim 22,
wherein the step(c) defines a climbing region and detects a vertical distance between two hands in the climbing region;
wherein the step (d)decides a climbing speed of the avatar according to the vertical distance between two hands in the climbing region.

41. The virtual reality avatar traveling control method of claim 40, wherein the step (d) decides the climbing speed only if the vertical distance between two hands is larger than a predetermined length.

* * * * *